US012310288B1

(12) United States Patent
Xiong

(10) Patent No.: US 12,310,288 B1
(45) Date of Patent: May 27, 2025

(54) HARVESTING METHOD OF SNAP-OFF PICKING GRIPPER, AND SNAP-OFF HARVESTING GRIPPER

(71) Applicant: Intelligent Equipment Research Center, Beijing Academy of Agriculture and Forestry Sciences, Beijing (CN)

(72) Inventor: Ya Xiong, Beijing (CN)

(73) Assignee: Intelligent Equipment Research Center, Beijing Academy of Agriculture and Forestry Sciences, Beijing (CN)

( * ) Notice: Subject to any disclaimer, the term of this patent is extended or adjusted under 35 U.S.C. 154(b) by 0 days.

(21) Appl. No.: 18/882,908

(22) Filed: Sep. 12, 2024

(30) Foreign Application Priority Data

Feb. 28, 2024 (CN) .......................... 202410219789.3

(51) Int. Cl.
*A01D 46/30* (2006.01)
*B25J 9/10* (2006.01)
*B25J 9/16* (2006.01)
*B25J 13/08* (2006.01)

(52) U.S. Cl.
CPC .............. *A01D 46/30* (2013.01); *B25J 9/104* (2013.01); *B25J 9/1697* (2013.01); *B25J 13/085* (2013.01)

(58) Field of Classification Search
CPC ......... A01D 46/30; B25J 9/104; B25J 9/1697; B25J 13/085
USPC ................. 700/245–264; 318/568.11–568.25
See application file for complete search history.

(56) References Cited

U.S. PATENT DOCUMENTS

| 4,873,644 A * | 10/1989 | Fujii ..................... B25J 9/1697 700/219 |
| 9,554,512 B2 * | 1/2017 | Davidson ............... B25J 9/1697 |
| 10,757,861 B2 * | 9/2020 | Robertson .......... G06Q 30/0283 |
| 11,272,662 B2 * | 3/2022 | Salisbury ............... A01D 46/24 |
| 11,477,942 B2 * | 10/2022 | Avigad ................... B25J 9/0093 |
| 11,540,444 B2 * | 1/2023 | Salisbury ............. B25J 15/0658 |

(Continued)

FOREIGN PATENT DOCUMENTS

| CN | 203896768 U | 10/2014 |
| CN | 110352702 A | 10/2019 |

(Continued)

*Primary Examiner* — Jaime Figueroa
(74) *Attorney, Agent, or Firm* — WCF IP

(57) ABSTRACT

This patent describes a method and apparatus for harvesting fruits using a snap-off harvesting gripper. The method includes the following steps: identifying the pose of a target fruit according to an image perception; controlling the gripper to grip the target according to the pose; monitoring an acting force of the gripper acted on the fruit to be harvested, determining a connection status between the target's stem and the target fruit according to the acting force, and controlling the gripper to rotate the target fruit according to the connection status. The snap-off harvesting apparatus includes a multi-axis adjusting device, a gripping device, sensor assemblies and a control device. The apparatus features tension sensors for real-time force monitoring and a parallel finger mechanism using pulleys and ropes for adaptive gripping. The apparatus's first joint can rotate the fruit to break the stem without requiring arm movement, enhancing efficiency.

8 Claims, 18 Drawing Sheets

(56) References Cited

U.S. PATENT DOCUMENTS

| | | | | |
|---|---|---|---|---|
| 11,647,692 B2* | 5/2023 | Knopf | | B25J 11/0045 |
| | | | | 56/332 |
| 12,096,733 B2* | 9/2024 | Robertson | | A01D 46/22 |
| 2011/0022231 A1* | 1/2011 | Walker | | A01M 7/0042 |
| | | | | 901/14 |
| 2016/0073584 A1* | 3/2016 | Davidson | | A01D 46/30 |
| | | | | 294/198 |
| 2017/0105346 A1* | 4/2017 | Davidson | | A01D 46/30 |
| 2017/0273241 A1* | 9/2017 | Salisbury | | A01D 46/24 |
| 2019/0261566 A1* | 8/2019 | Robertson | | G06T 7/50 |
| 2019/0387678 A1* | 12/2019 | Knopf | | A01D 46/253 |
| 2020/0128744 A1* | 4/2020 | Avigad | | B25J 19/023 |
| 2020/0196528 A1* | 6/2020 | Salisbury | | B25J 9/1679 |
| 2020/0323140 A1* | 10/2020 | Gielis | | A01D 46/24 |
| 2021/0000013 A1* | 1/2021 | Robertson | | B25J 15/0019 |
| 2021/0045290 A1* | 2/2021 | Takemura | | B25J 13/081 |
| 2021/0251145 A1* | 8/2021 | Nuske | | A01D 46/24 |
| 2021/0323174 A1* | 10/2021 | Salisbury | | A01D 46/30 |
| 2021/0337733 A1* | 11/2021 | Dondeyne | | A01D 46/30 |
| 2021/0368684 A1* | 12/2021 | Araki | | A01D 46/253 |
| 2022/0087105 A1* | 3/2022 | Maor | | A01D 46/00 |
| 2022/0142050 A1* | 5/2022 | Chen | | A01D 46/253 |
| 2022/0192094 A1* | 6/2022 | Salisbury | | A01D 46/24 |
| 2022/0272900 A1* | 9/2022 | Hiraoka | | B25J 19/023 |
| 2022/0346319 A1* | 11/2022 | Kim | | A61L 2/24 |
| 2023/0189713 A1* | 6/2023 | Maor | | A01D 46/30 |
| | | | | 56/328.1 |
| 2023/0354747 A1* | 11/2023 | Chavasse | | A01D 46/30 |
| 2023/0397536 A1* | 12/2023 | Smith | | A01G 9/143 |
| 2023/0399136 A1* | 12/2023 | Budu | | B25J 9/0084 |
| 2024/0107947 A1* | 4/2024 | Borgatti | | A01D 46/30 |

FOREIGN PATENT DOCUMENTS

| | | |
|---|---|---|
| CN | 114271103 A | 4/2022 |
| CN | 219165182 U | 6/2023 |

* cited by examiner

US 12,310,288 B1

HARVESTING METHOD OF SNAP-OFF PICKING GRIPPER, AND SNAP-OFF HARVESTING GRIPPER

CROSS-REFERENCE TO RELATED APPLICATION

This patent application claims the benefit and priority of Chinese Patent Application No. 202410219789.3 filed with the China National Intellectual Property Administration on Feb. 28, 2024, the disclosure of which is incorporated by reference herein in its entirety as part of the present application.

TECHNICAL FIELD

The present disclosure relates to the technical field of harvesting robots, and in particular to a harvesting method of a snap-off harvesting gripper, and the snap-off harvesting gripper.

BACKGROUND

In the related art, the common fruit and vegetable harvesting grippers can be divided into a shear type, a pull-off type, a twist-off type and a snap-off type according to the separation modes of fruits and fruit stems.

A blade-shaped structure is usually arranged at an execution end of the shear type gripper to shear the fruit stem. After the shear type gripper is used for a long time, fruit stem and serous fluid is easy to remain on the blade, which hinders the movement of the blade, and is easy to wear the blade and damage the fruit.

The pull-off gripper is easy to damage the fruit itself when the fruit stem is hard. The twist-off gripper is suitable for apples and other fruits with short stems, but it is difficult to separate strawberries, kiwifruit and other fruits with long stems from the stems, and it is also easy to cause damage to the fruits themselves. The snap-off gripper is suitable for fruits with long fruit stems, which requires less axial tension and can reduce fruit damage. However, the snap-off gripper mainly separates the fruits from the fruit stems by bending the fruit stems, and it is difficult to determine whether the fruits have been separated from the fruit stems in the bending process, which may easily lead to harvesting failure or low harvesting efficiency.

SUMMARY

A harvesting method of a snap-off harvesting gripper and the snap-off harvesting gripper are provided by the present disclosure, which are used to solve the problem of harvesting failure or low harvesting efficiency caused by a situation that it is difficult to determine whether the fruit is separated from a fruit stem in the harvesting process of the snap-off gripper in the prior art.

In a first aspect, a harvesting method of a snap-off harvesting gripper includes the following steps:
  identifying a position and orientation of a fruit to be harvested according to an image of the fruit to be harvested;
  controlling the snap-off harvesting gripper to grip the fruit to be harvested according to the position and orientation of the fruit to be harvested; and
  monitoring an acting force of the snap-off harvesting gripper acted on the fruit to be harvested, determining a connection status between a fruit stem and the fruit to be harvested according to the acting force, and controlling the snap-off harvesting gripper to rotate the fruit to be harvested according to the connection status between the fruit stem and the fruit to be harvested, thus bending the fruit stem until the fruit stem is separated from the fruit to be harvested.

According to the harvesting method of a snap-off harvesting gripper of the present disclosure, the step of monitoring an acting force of the snap-off harvesting gripper acted on the fruit to be harvested, determining a connection status between a fruit stem and the fruit to be harvested according to the acting force, and controlling the snap-off harvesting gripper to rotate the fruit to be harvested according to the connection status between the fruit stem and the fruit to be harvested, thus bending the fruit stem until the fruit stem is separated from the fruit to be harvested includes the following steps:
  monitoring a rotation moment of the snap-off harvesting gripper relative to the fruit to be harvested;
  continuing to increase a rotation angle of the snap-off harvesting gripper to the fruit to be harvested when the rotation moment of the fruit to be harvested relative to the snap-off harvesting gripper is not plunged in a stepped manner; and
  controlling the snap-off harvesting gripper to stop rotating when the rotation moment of the fruit to be harvested relative to the snap-off harvesting gripper is plunged in a stepped manner.

According to the harvesting method of a snap-off harvesting gripper of the present disclosure, the step of controlling the snap-off harvesting gripper to grip the fruit to be harvested includes the following steps:
  monitoring a gripping force of the snap-off harvesting gripper acted on the fruit to be harvested; and
  controlling the snap-off harvesting gripper to keep the gripping force within a preset range.

According to the harvesting method of a snap-off harvesting gripper of the present disclosure, the step of identifying a position and orientation of the fruit to be harvested according to an image of the fruit to be harvested includes the following steps:
  identifying a shape and position of the fruit to be harvested and an obstacle near the fruit to be harvested according to the image of the fruit to be harvested.

According to the harvesting method of a snap-off harvesting gripper of the present disclosure, a gripping space configured for gripping the fruit to be harvested is formed in the snap-off harvesting gripper. The step of controlling the snap-off harvesting gripper to grip the fruit to be harvested according to the position and orientation of the fruit to be harvested includes the following steps:
  acquiring a distance between each obstacle and the fruit to be harvested, and when the distance between the obstacle and the fruit to be harvested is less than or equal to a first preset distance, controlling the snap-off harvesting gripper to move the corresponding obstacle, and making the distance between each obstacle and the fruit to be harvested greater than the first preset distance;
  adjusting the orientation of the snap-off harvesting gripper to make the gripping space in fit with the shape of the fruit to be harvested, and controlling the snap-off harvesting gripper to approach the fruit to be harvested until a center line of the gripping space coincides with a center line in a vertical direction of the fruit to be harvested;

controlling the snap-off harvesting gripper to grip the fruit to be harvested, and in the process of controlling the snap-off harvesting gripper to grip the fruit to be harvested, reciprocally rotating an end joint of the snap-off harvesting gripper to move surrounding obstacles of the end joint of the snap-off harvesting gripper; and adjusting the orientation of the snap-off harvesting gripper to make the distance between the snap-off harvesting gripper and each obstacle greater than a second preset distance.

In a second aspect, a snap-off harvesting gripper provided by the present disclosure includes:

a multi-axis adjusting device;

a gripping device, comprising first joints arranged oppositely and joint assemblies corresponding to the first joints one by one, where a gripping space configured for gripping a fruit to be harvested is formed between two first joints, the first joints are rotatably arranged on a corresponding one of the joint assemblies, and the joint assemblies are movably arranged on the multi-axis adjusting device to adjust a distance between the first joints;

sensor assemblies arranged at the first joints and the joint assemblies and configured to detect a force exerted on the first joints and the joint assemblies; and a control device, electrically connected to the multi-axis adjusting device, the gripping device, and the sensor assemblies, where the control device is configured to identify a position and orientation of the fruit to be harvested according to an image of the fruit to be harvested, control the multi-axis adjusting device to adjust a position of the gripping device according to the position and orientation of the fruit to be harvested, control the first joints to grip the fruit to be harvested according to the force exerted on the joint assemblies, and control the first joints to rotate to pick the fruit to be harvested according to the force exerted on the first joints.

According to the snap-off harvesting gripper of the present disclosure, the joint assemblies each include a second joint and a third joint. The gripping device further includes a first driving part and a second driving part, and a fixed portion is arranged on the multi-axis adjusting device.

Each of the first joints is rotatably arranged at a corresponding second joint, an output end of the first driving part is in transmission connection with the first joints to drive the first joints to rotate to snap off a fruit stem of the fruit to be harvested.

The third joint is rotatably connected to the multi-axis adjusting device, an output end of the second driving part is in transmission connection with the third joint, the second joint is rotatably connected to a corresponding third joint, and a rotating shaft of the second joint is connected to the fixed portion.

The second driving part is configured to drive the third joint to rotate to adjust a spacing between the first joints. When the third joint rotates, the fixed portion drives the rotating shaft of the second joint to rotate reversely, thus keeping opposite second joints parallel.

The first driving part and the second driving part are both electrically connected to the control device.

According to the snap-off harvesting gripper of the present disclosure, the fixed portion includes a first pulley and a fixed rope. The first pulley is fixedly arranged on the multi-axis adjusting device.

A second pulley is coaxially arranged at the rotating shaft of the second joint, and the fixed rope is wound around the first pulley and the second pulley and fixedly connected to the first pulley and the second pulley.

According to the snap-off harvesting gripper of the present disclosure, the first driving part and the second driving part each include a driving motor and a transmission rope/belt.

Output ends of the driving motors of the first driving part and the second driving part are in transmission connection with rotating shafts of the first joints and the third joint through the corresponding transmission ropes/belts, respectively.

According to the snap-off harvesting gripper of the present disclosure, the sensor assemblies include a first tension sensor and a second tension sensor.

The first tension sensor is arranged at the transmission rope/belt of the first driving part; and the second tension sensor is arranged at the transmission rope/belt of the second driving part.

According to the harvesting method of a snap-off harvesting gripper, an orientation of a fruit to be harvested and a relative position with the snap-off harvesting gripper are determined by processing and identifying an image of the fruit to be harvested, such that the snap-off harvesting gripper can approach and grip the fruit to be harvested, and the snap-off harvesting gripper can rotate the fruit to be harvested to bend and snap off a fruit stem of the fruit to be harvested, thus completing harvesting. In the process of rotating the fruit to be harvested by the snap-off harvesting gripper, the acting force between the snap-off harvesting gripper and the fruit to be harvested is monitored, and a connection state of the fruit to be harvested and the fruit stem is determined by the acting force, such that the snap-off harvesting gripper is ensured to rotate the fruit to be harvested and snap off the fruit stem, the success rate of snap-off is guaranteed, the situation of prolonged harvesting time and reduced harvesting efficiency caused by a situation that the snap-off harvesting gripper continues to rotate after the fruit stem is broken off is also avoided, and thus effectively solving the problem of harvesting failure or low harvesting efficiency caused by a situation that it is difficult to determine whether the fruit is separated from the fruit stem in the harvesting process of the snap-off harvesting gripper in the prior art.

BRIEF DESCRIPTION OF THE DRAWINGS

To describe the technical solutions of the present disclosure or in the prior art more clearly, the following briefly introduces the accompanying drawings required in the description of the embodiments or the prior art. Apparently, the accompanying drawings in the following description show merely some embodiments of the present disclosure, and those skilled in the art may still derive other drawings in accordance with these accompanying drawings without creative efforts.

Figure 1:
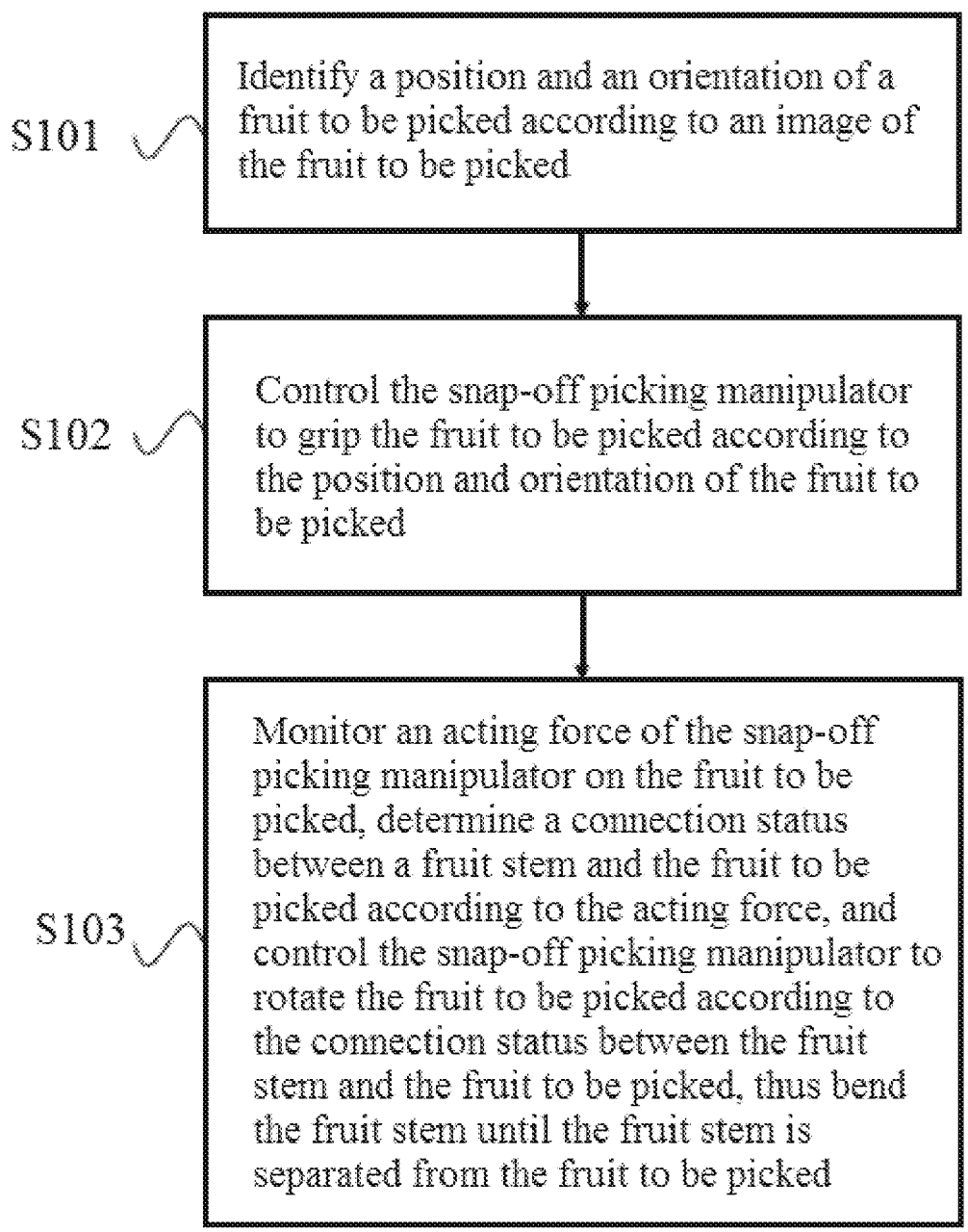
FIG. 1 is a first flow chart of a harvesting method of a snap-off harvesting gripper according to an embodiment of the present disclosure.
Figure 2:
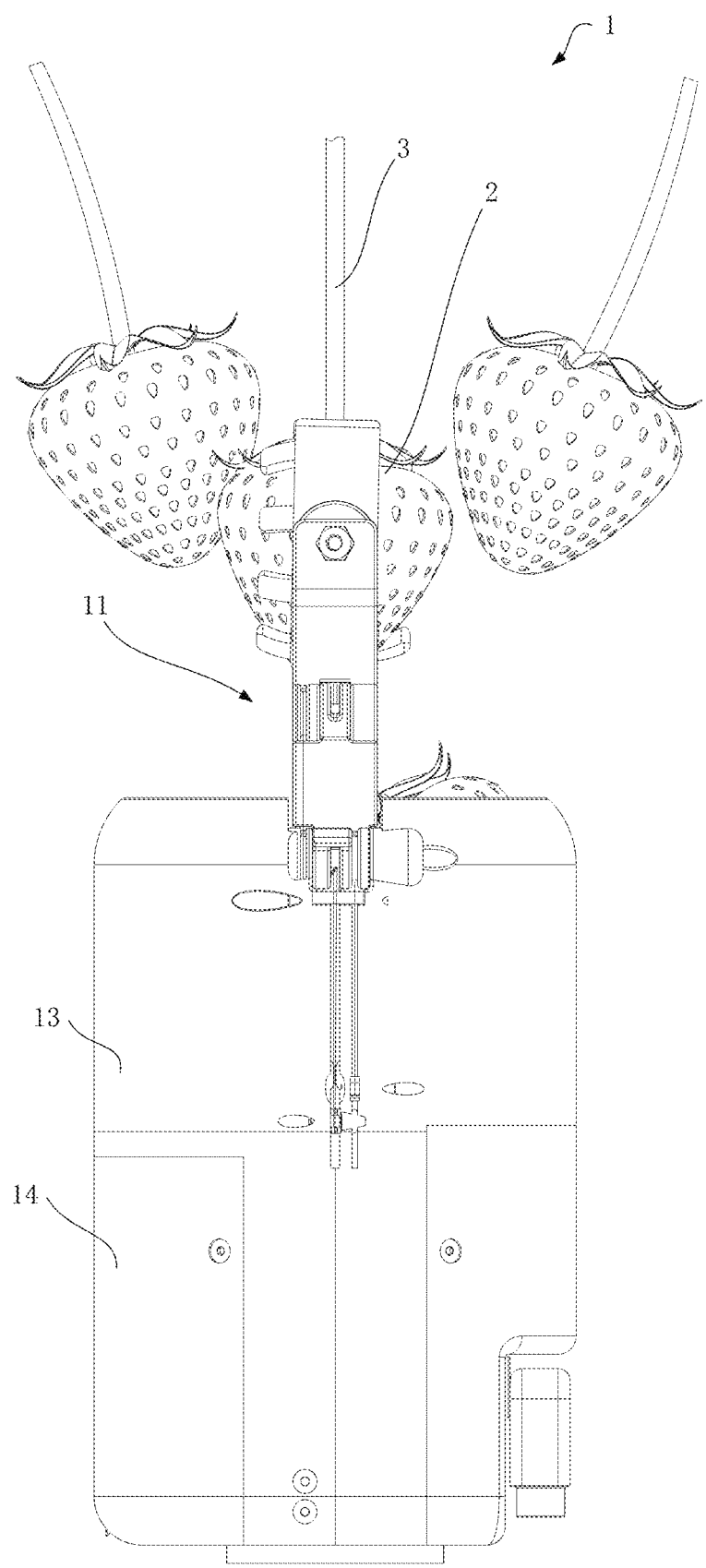
FIG. 2 is a first side view of a snap-off harvesting gripper according to an embodiment of the present disclosure for harvesting.
Figure 3:
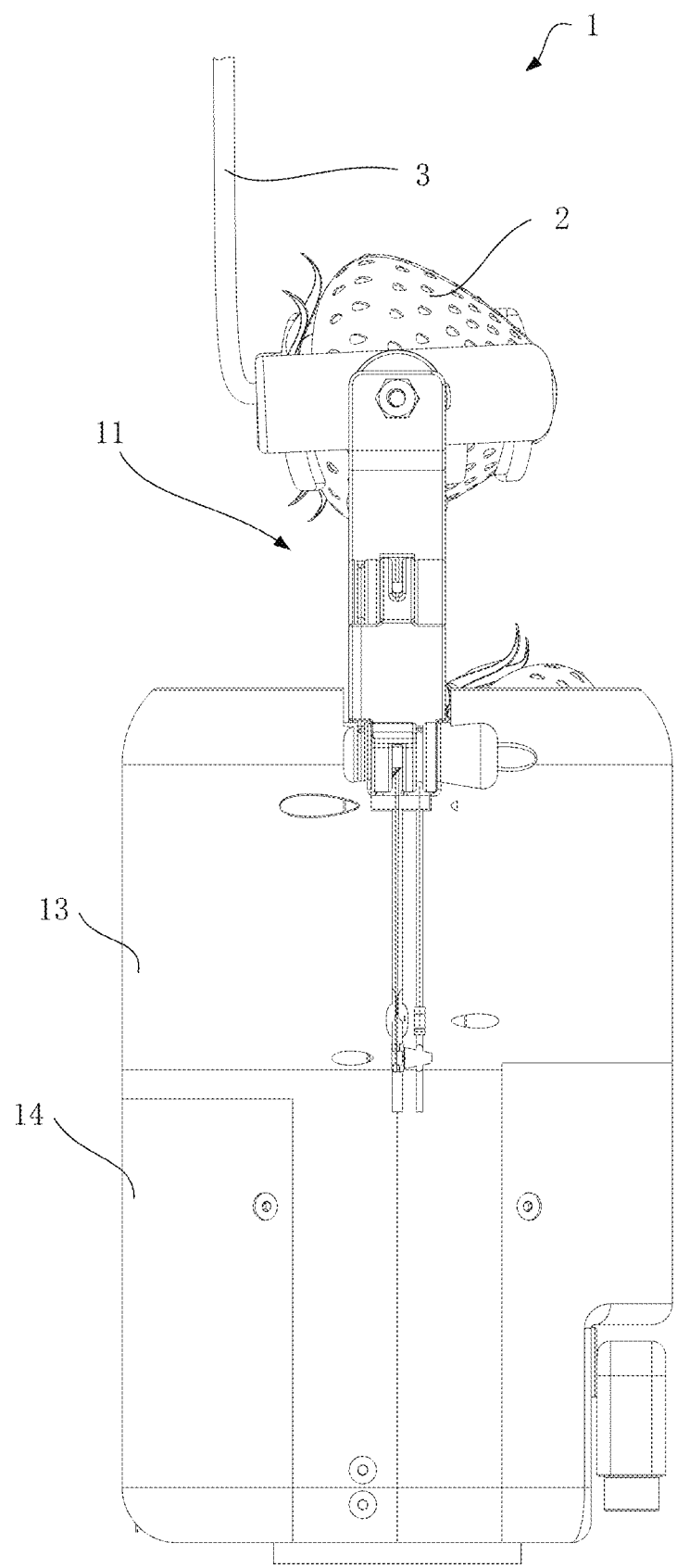
FIG. 3 is a second side view of a snap-off harvesting gripper according to an embodiment of the present disclosure for harvesting.
Figure 4:
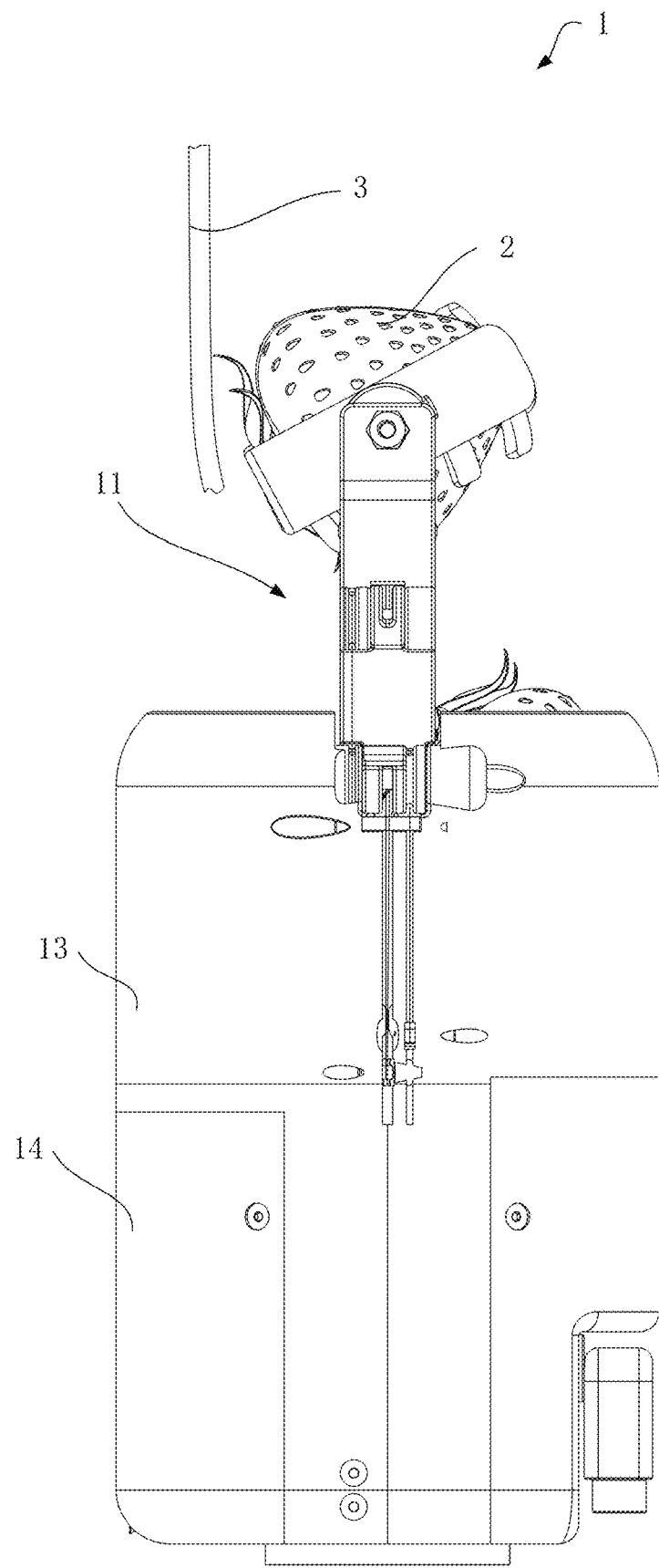
FIG. 4 is a third side view of a snap-off harvesting gripper according to an embodiment of the present disclosure for harvesting.
Figure 5:
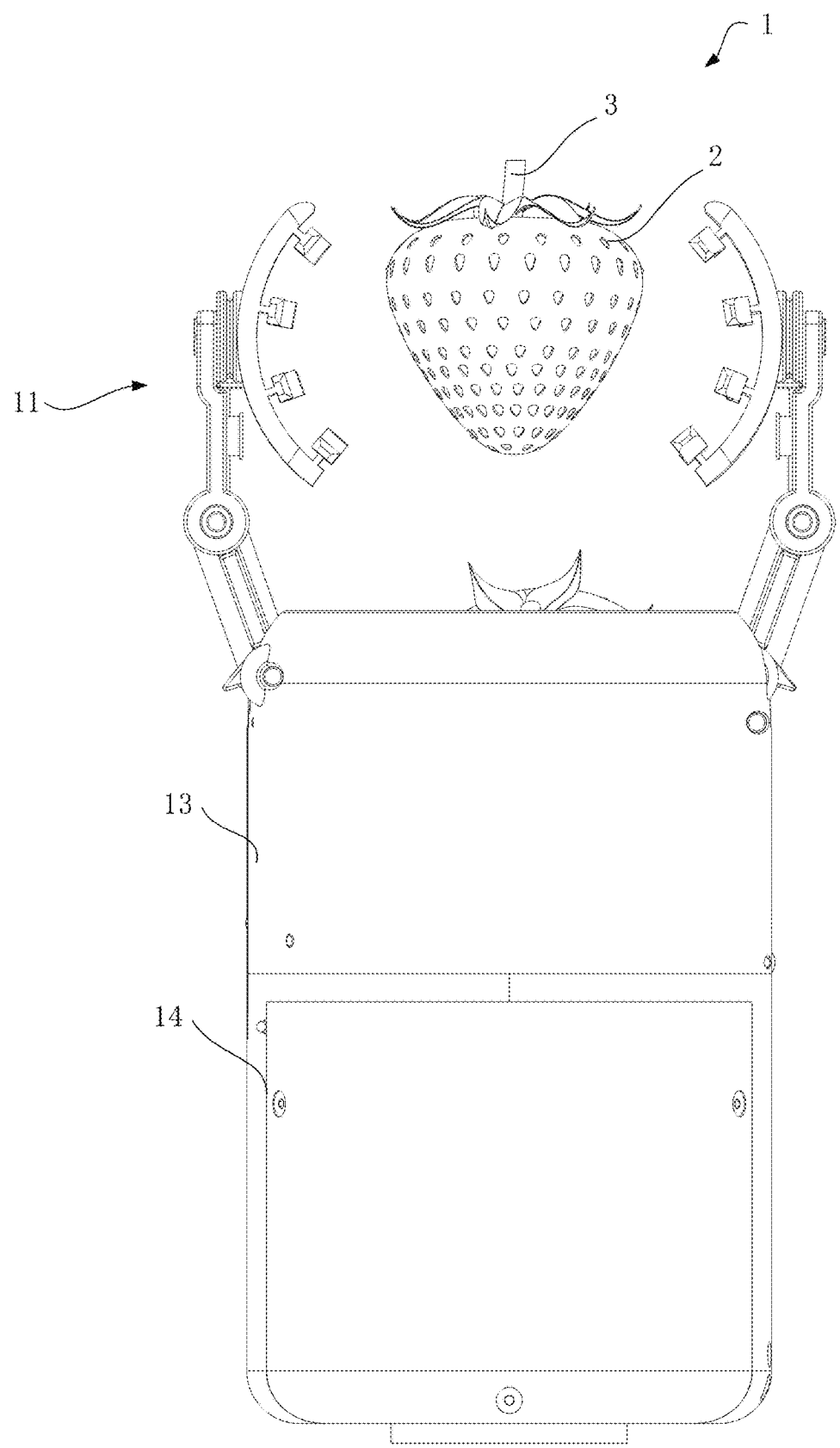
FIG. 5 is a first front view of a snap-off harvesting gripper according to an embodiment of the present disclosure for harvesting.
Figure 6:
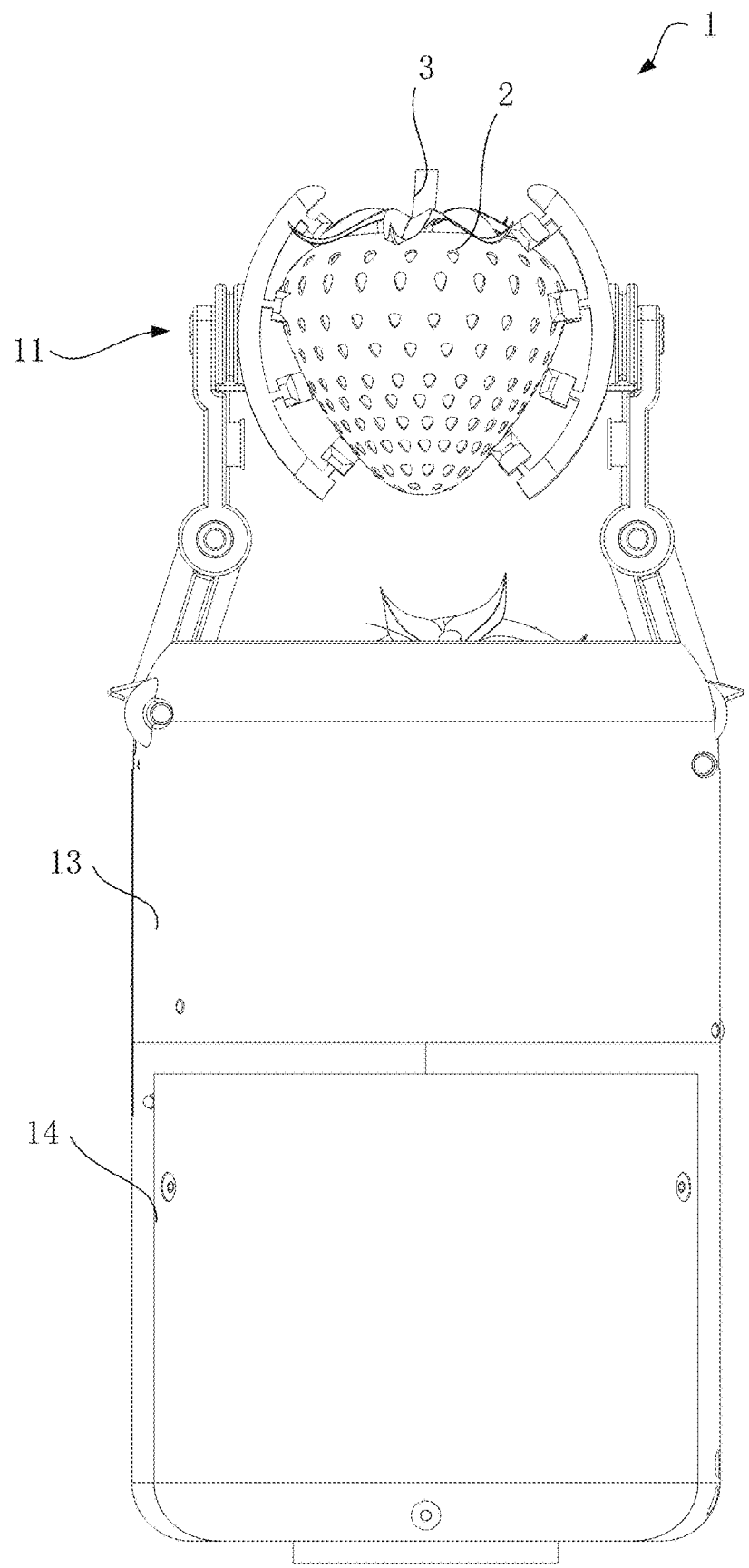
FIG. 6 is a second front view of a snap-off harvesting gripper according to an embodiment of the present disclosure for harvesting.
Figure 7:
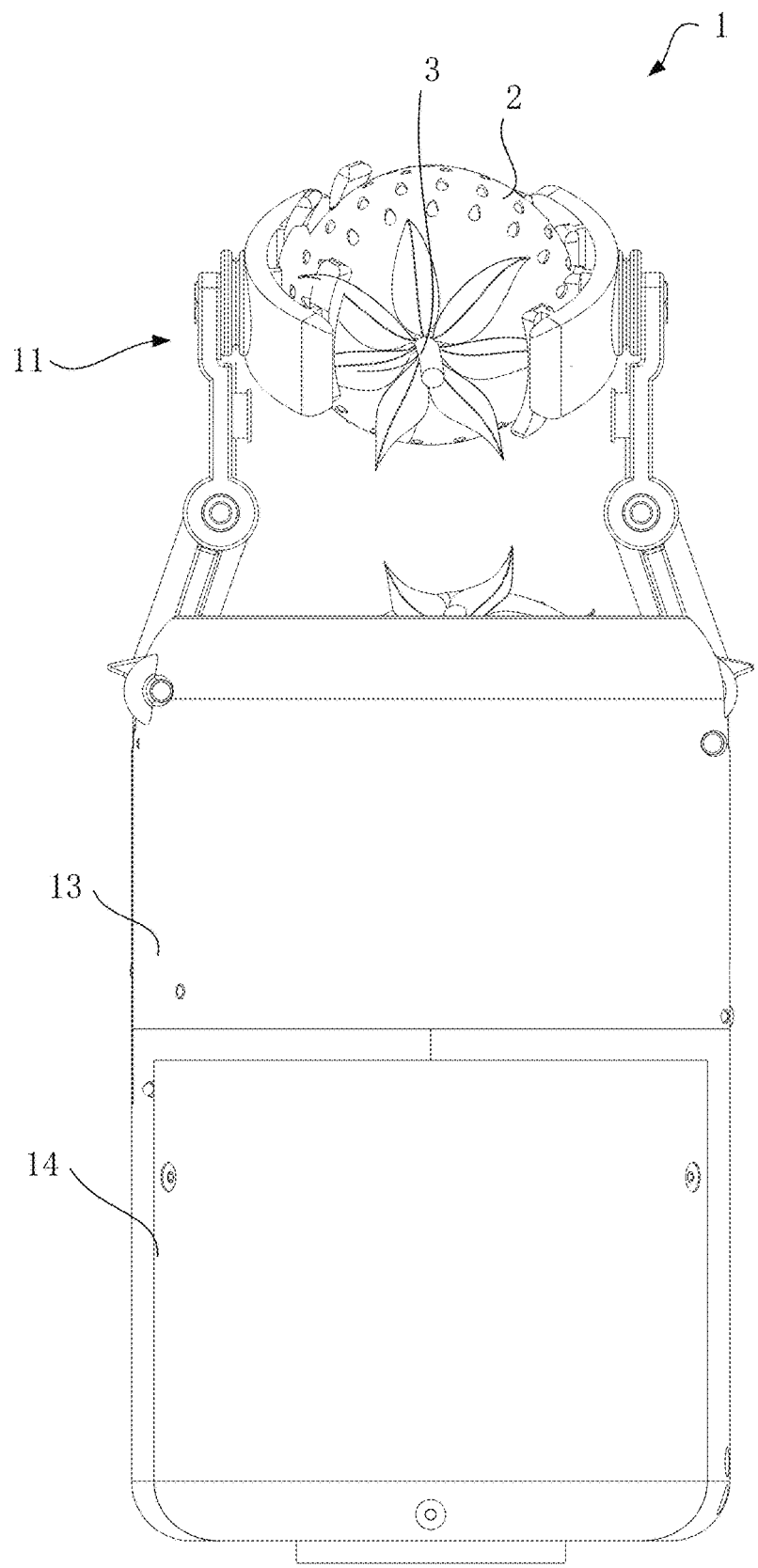
FIG. 7 is a third front view of a snap-off harvesting gripper according to an embodiment of the present disclosure for harvesting.
Figure 8:
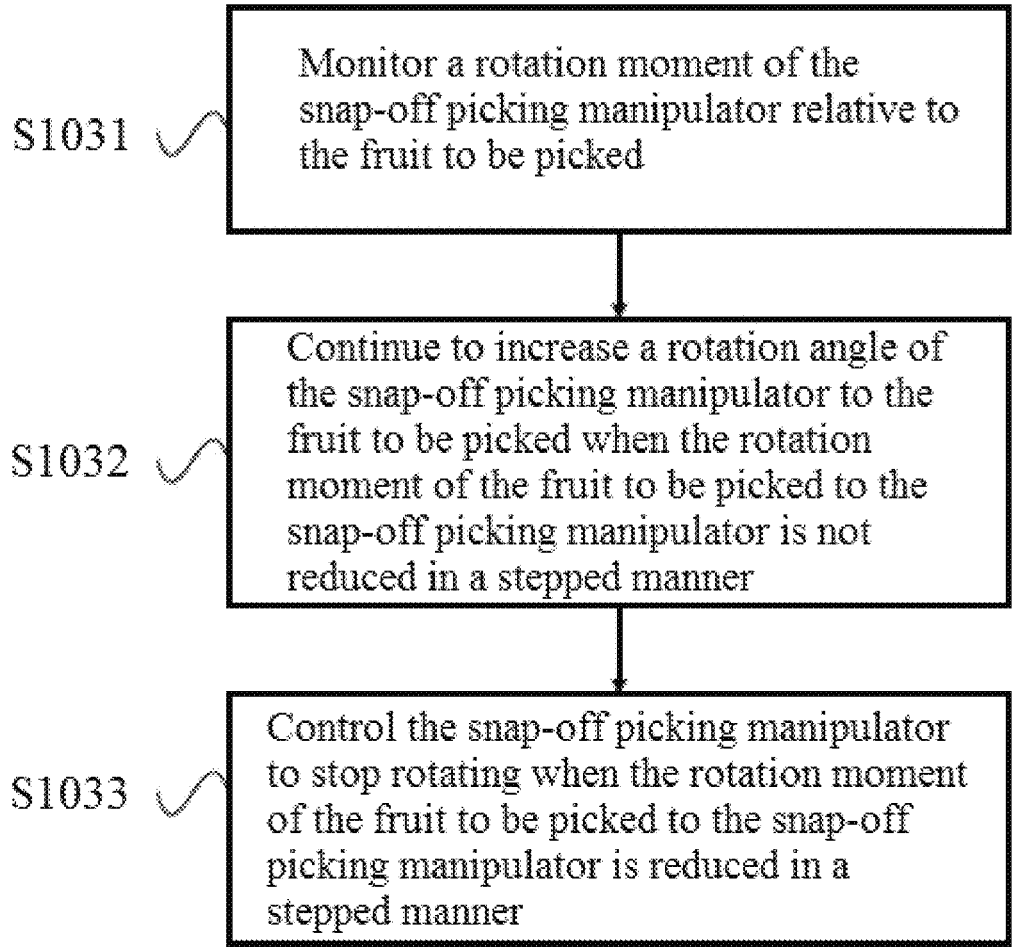
FIG. 8 is a second flow chart of a harvesting method of a snap-off harvesting gripper according to an embodiment of the present disclosure.

Reference signs:

1, snap-off harvesting gripper; 2, fruit to be harvested; 3, fruit stem;

11, gripping device; 111, first joint; 1111, flexible protruded portion; 112, joint assembly; 1121, second joint; 1122, third joint; 113, transmission rope;

12, sensor assembly; 13, storage bin; 14, electrical appliance bin.

DETAILED DESCRIPTION OF THE EMBODIMENTS

To make the objectives, technical solutions and advantages of the present disclosure more clearly, the following clearly and completely describes the technical solutions in the present disclosure with reference to the accompanying drawings in the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

In the description of the present disclosure, it should be noted that, the orientation or positional relationship indicated by terms "upper", "lower", "front", "rear", "inside" and "outside" is based on the orientation or positional relationship shown in the drawings, which is only for convenience of description of the present disclosure and simplification of description rather than indicating or implying that the device or element referred to must have a particular orientation, be constructed and operated in a particular orientation, and thus which is not to be construed as a limit to the present disclosure. Furthermore, the terms "first", "second" and "third" are merely used for descriptive purposes and are not to be construed as indicating or implying relative importance.

In the present disclosure, it should be noted that, unless expressly specified and limited otherwise, the terms "mount", "connected" and "connection" should be understood broadly, e.g., may be either a fixed connection, a detachable connection, or an integrated connection; may be a mechanical connection, or an electrical connection; may be a direct connection, an indirect connection through an intermediate medium; and may be an internal communication between internals of two elements. For those skilled in the art, the specific meanings of the above terms in the present disclosure can be understood in the light of specific conditions.

A harvesting method of a snap-off harvesting gripper according to the present disclosure is described below in conjunction with FIG. 1 to FIG. 11.

As shown in FIG. 1 to FIG. 8, a harvesting method of a snap-off harvesting gripper includes the following steps:

Step S101: identifying a position and an orientation of a fruit to be harvested according to an image of the fruit to be harvested;

Step S102: controlling the snap-off harvesting gripper to grip the fruit to be harvested according to the position and orientation of the fruit to be harvested; and Step S103: monitoring an acting force between the snap-off harvesting gripper and the fruit to be harvested, determining a connection status between a fruit stem and the fruit to be harvested according to the acting force, and controlling the snap-off harvesting gripper to rotate the fruit to be harvested according to the connection status between the fruit stem and the fruit to be harvested, thus bending the fruit stem until the fruit stem is separated from the fruit to be harvested.

In general, before harvesting, an image around the snap-off harvesting gripper 1 needs to be shoot or scan through a visual device (e.g., a camera, a laser radar, etc.). Then, the acquired image is processed by the control device to identify the fruit 2 to be harvested, and determine the relative position between the fruit 2 to be harvested and the snap-off harvesting gripper 1 and a current orientation of the fruit 2 to be harvested. Specifically, the orientation of the fruit 2 to be harvested includes, but is not limited to, the position of the fruit stem 3 connected to the fruit 2 to be harvested, the angle between the fruit stem 3 and the fruit 2 to be harvested, and the like.

After the position and orientation of the fruit 2 to be harvested are determined, the position and orientation of the snap-off harvesting gripper 1 can be controlled, such that the snap-off harvesting gripper 1 can approach the position of the fruit 2 to be harvested in a proper orientation. After the snap-off harvesting gripper 1 reaches the corresponding position of the fruit 2 to be harvested, the snap-off harvesting gripper 1 can be controlled to grip the fruit 2 to be harvested.

After the fruit 2 to be harvested is gripped by the snap-off harvesting gripper 1, the snap-off harvesting gripper 1 can be controlled to rotate the fruit 2 to be harvested, such that the fruit stem 3 of the fruit 2 to be harvested can be bent, and the degree of bending is gradually increased until the fruit stem 3 is broken off, thus separating the fruit 2 to be harvested from the fruit stem 3. Specifically, in the process of bending the fruit stem 3, the fruit stem 3 can apply an acting force on the fruit 2 to be harvested, and the part of the acting force may be transferred to the snap-off harvesting gripper 1 through the fruit to be harvested 1. While the fruit stem 3 is broken off, the acting force of the fruit stem 3 on the fruit 2 to be harvested will be changed suddenly. In the process of rotating the fruit 2 to be harvested by the snap-off harvesting gripper 1, a connection status between the fruit stem 3 and the fruit 2 to be harvested can be determined by monitoring the acting force of the snap-off harvesting gripper 1 acted on the fruit 2 to be harvested, and the snap-off harvesting gripper 1 can be controlled based on the connection status between the fruit stem 3 and the fruit 2 to be harvested, such that it is avoid that the snap-off harvesting gripper 1 stops rotating the fruit 2 to be harvested when the fruit stem 3 is still not broken off, or that the snap-off harvesting gripper 1 still continues to rotate the fruit 2 to be harvested after the fruit stem 3 has been broken off. Not only the success rate of snapping off is ensured, but also the harvesting efficiency is further improved.

According to a harvesting method of a snap-off harvesting gripper, an orientation of a fruit 2 to be harvested and a relative position between the fruit 2 to be harvested and the snap-off harvesting gripper 1 are determined by processing and identifying an image of the fruit 2 to be harvested, such that the snap-off harvesting gripper 1 can approach and grip the fruit 2 to be harvested, and the snap-off harvesting gripper 1 can rotate the fruit 2 to be harvested to bend and snap off a fruit stem 3 of the fruit 2 to be harvested, thus completing harvesting. In the process of rotating the fruit 2 to be harvested by the snap-off harvesting gripper 1, the acting force of the snap-off harvesting gripper 1 acted on the fruit 2 to be harvested is monitored, and a connection state of the fruit 2 to be harvested and the fruit stem 3 is determined by the acting force, such that the snap-off harvesting gripper 1 is ensured to rotate the fruit 2 to be harvested and snap off the fruit stem 3, thus ensuring the success rate of snap-off, and also avoiding the prolonged harvesting time and reduced harvesting efficiency caused by the situation that the snap-off harvesting gripper 1 continues to rotate after the fruit stem 3 is broken off, and effectively solving the problem of harvesting failure or low harvesting efficiency caused by the situation that the snap-off harvesting gripper 1 in the prior art is difficult to determine whether the fruit is separated from the fruit stem in the harvesting process.

Specifically, as shown in FIG. 3 to FIG. 8, Step S103: monitoring an acting force of the snap-off harvesting gripper acted on the fruit to be harvested, determining a connection status between a fruit stem and the fruit to be harvested according to the acting force, and controlling the snap-off harvesting gripper to rotate the fruit to be harvested according to the connection status between the fruit stem and the fruit to be harvested so as to bend the fruit stem until the fruit stem is separated from the fruit to be harvested, includes the following steps:

Step S1031: monitoring a rotation moment of the snap-off harvesting gripper relative to the fruit to be harvested;

Step S1032: continuing to increase a rotation angle of the snap-off harvesting gripper to the fruit to be harvested when the rotation moment of the fruit to be harvested relative to the snap-off harvesting gripper is not plunged in a stepped manner; and Step S1033: controlling the snap-off harvesting gripper to stop rotating when the rotation moment of the fruit to be harvested relative to the snap-off harvesting gripper is plunged in a stepped manner.

In the process of rotating the fruit 2 to be harvested by the snap-off harvesting gripper 1, the bent fruit stem 3 mainly generates a rotation moment opposite to a rotation direction on the fruit 2 to be harvested. Correspondingly, the rotation moment will be transferred to the snap-off harvesting gripper 1 by the fruit 2 to be harvested. Therefore, in the process of rotating the fruit 2 to be harvested by the snap-off harvesting gripper 1, the rotation moment of the snap-off harvesting gripper 1 relative to the fruit 2 to be harvested needs to be monitored, thus confirming a connection status between the fruit 2 to be harvested and the fruit stem 3.

Specifically, when the rotation moment of the fruit to be harvested 2 on the snap-off harvesting gripper 1 is not plunged in a stepped manner, and the rotation of the snap-off harvesting gripper 1 on the fruit 2 to be harvested is changed, it is indicated that the fruit stem 3 is still connected with the fruit to be harvested 2, and it is required to continue to increase the moment of the snap-off harvesting gripper 1 on the fruit to be harvested 2, thus continuing to rotate the fruit 2 to be harvested, such that the rotation angle of the fruit 2 to be harvested gradually is gradually increased until the fruit stem 3 is broken off, thus completing the harvesting.

At the moment that the fruit stem 3 is broken off, the fruit 2 to be harvested is separated from the fruit stem 3, and the fruit stem 3 no longer exerts acting force on the fruit 2 to be harvested, and the rotation moment of the fruit stem 3 on the fruit 2 to be harvested disappears in an instant. Therefore, when the rotation moment of the fruit 2 to be harvested on the snap-off harvesting gripper 1 is plunged in a stepped manner, it is indicated that the harvesting is completed, and then the snap-off harvesting gripper 1 can be controlled to stop rotating, thus avoiding to continue rotating and waste time.

In the process of snapping off the fruit stem 3, as relative positions of the fruit stem 3 and the fruit 2 to be harvested will change, the fruit 2 to be harvested may block the fruit stem 3, making it difficult to confirm a connection state between the fruit stem 3 and the fruit 2 by visual images. According to the harvesting method provided by the present disclosure, the connection state of the fruit stem 3 and the fruit 2 to be harvested can be determined by monitoring the acting force between the fruit 2 to be harvested and the snap-off harvesting gripper 1, thus achieving a more accurate and convenient judgement without being affected by the mutual shielding between the fruit stem 3 and the fruit 2 to be harvested.

In some embodiments, the step of controlling the snap-off harvesting gripper to grip the fruit to be harvested includes the following steps:

monitoring a gripping force of the snap-off harvesting gripper acted on the fruit to be harvested; and controlling the snap-off harvesting gripper to keep the gripping force within a preset range.

In this embodiment, before controlling the snap-off harvesting gripper 1 to grip the fruit 2 to be harvested, it is generally required to determine the preset range of the gripping force of the snap-off harvesting gripper 1 on the fruit 2 to be harvested. When the gripping force is less than the lower limit of the preset range, the gripping force of the snap-off harvesting gripper 1 on the fruit 2 to be harvested is too small, and the fruit 2 to be harvested is easy to slip off from the snap-off harvesting gripper 1, resulting in harvesting failure. When the gripping force is greater than the upper limit of the preset range, the gripping force of the snap-ff harvesting gripper 1 on the fruit 2 to be harvested is too large, which may cause damage to the fruit 2 to be harvested. By monitoring the gripping force of the snap-off harvesting gripper 1 acted on the fruit 2 to be harvested, the snap-off harvesting gripper 1 is controlled to grip or loose the fruit 2 to be harvested, such that the gripping force of the snap-off harvesting gripper 1 on the fruit 2 to be harvested is always kept within the preset range, thus achieving stably grip the fruit 2 to be harvested and avoiding damaging the fruit 2 to be harvested with the gripping force of the snap-off harvesting gripper 1 on the fruit 2 to be harvested.

Alternatively, in some embodiments, before controlling the snap-off harvesting gripper 1 to grip the fruit 2 to be harvested, the variety and maturity of the fruit 2 to be harvested can be determined by an image of the fruit 2 to be harvested, and the corresponding preset range can be selected by the determined variety and maturity of the fruit 2 to be harvested, making the preset range adjustable according to the variety and maturity of the fruit 2 to be harvested. Therefore, the snap-off harvesting gripper 1 can grip and pick the fruit 2 to be harvested with different varieties and maturity.

In some embodiments, Step S101: identifying a position and an orientation of the fruit to be harvested according to the image of the fruit to be harvested, includes the following steps:

identifying a shape and a position of the fruit to be harvested according to the image of the fruit to be harvested, and identifying an obstacle near the fruit to be harvested.

In this embodiment, after acquiring the image of the fruit 2 to be harvested, the image is processed, and the shape and position of the fruit 2 to be harvested in the image are identified, and objects around the fruit 2 to be harvested, such as other fruits, branches and leaves, are identified, so as to later avoiding these obstacles when the snap-off harvesting gripper 1 is controlled to move.

Figure 9:
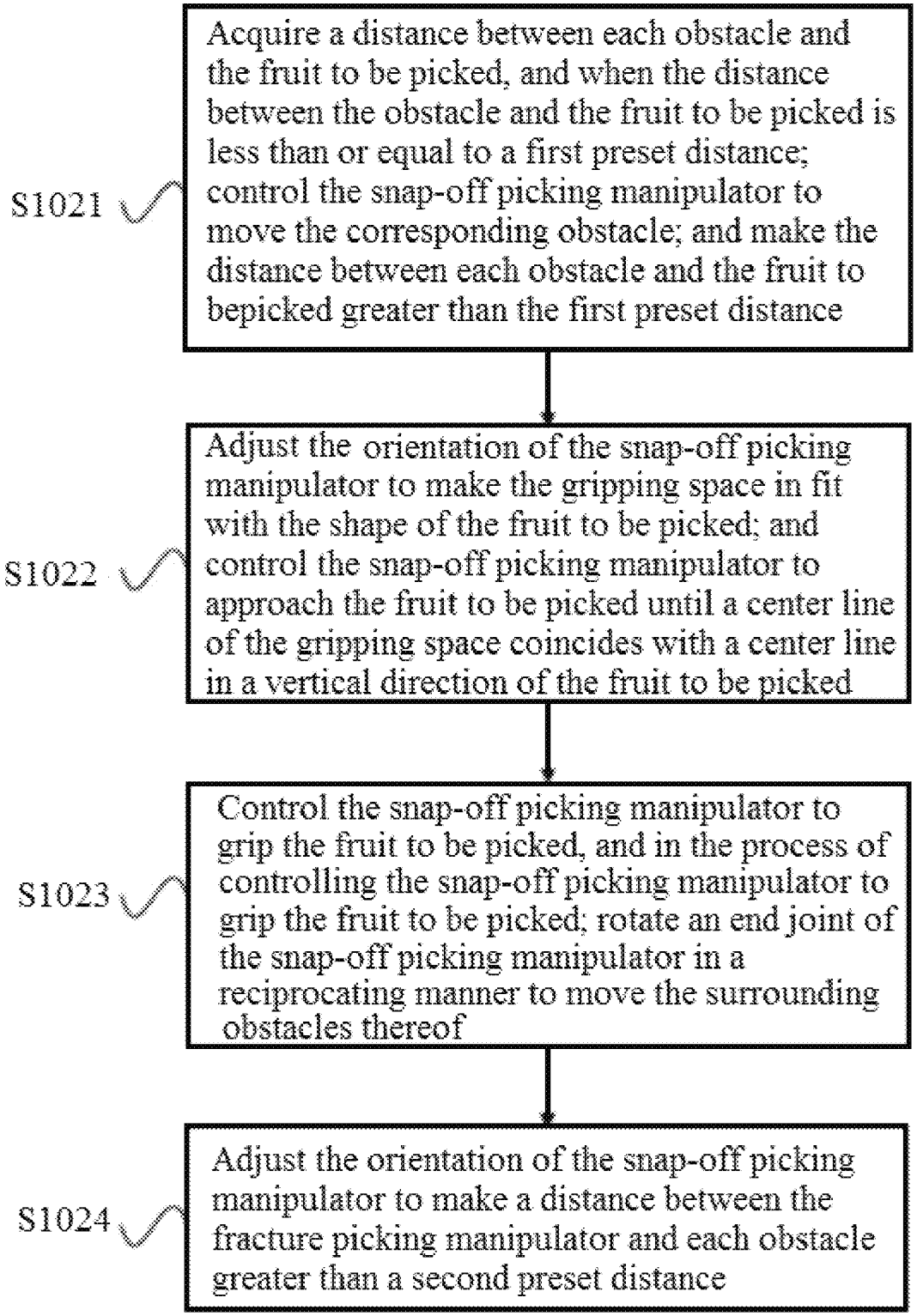
FIG. 9 is a third flow chart of a harvesting method of a snap-off harvesting gripper according to an embodiment of the present disclosure.
Figure 12:
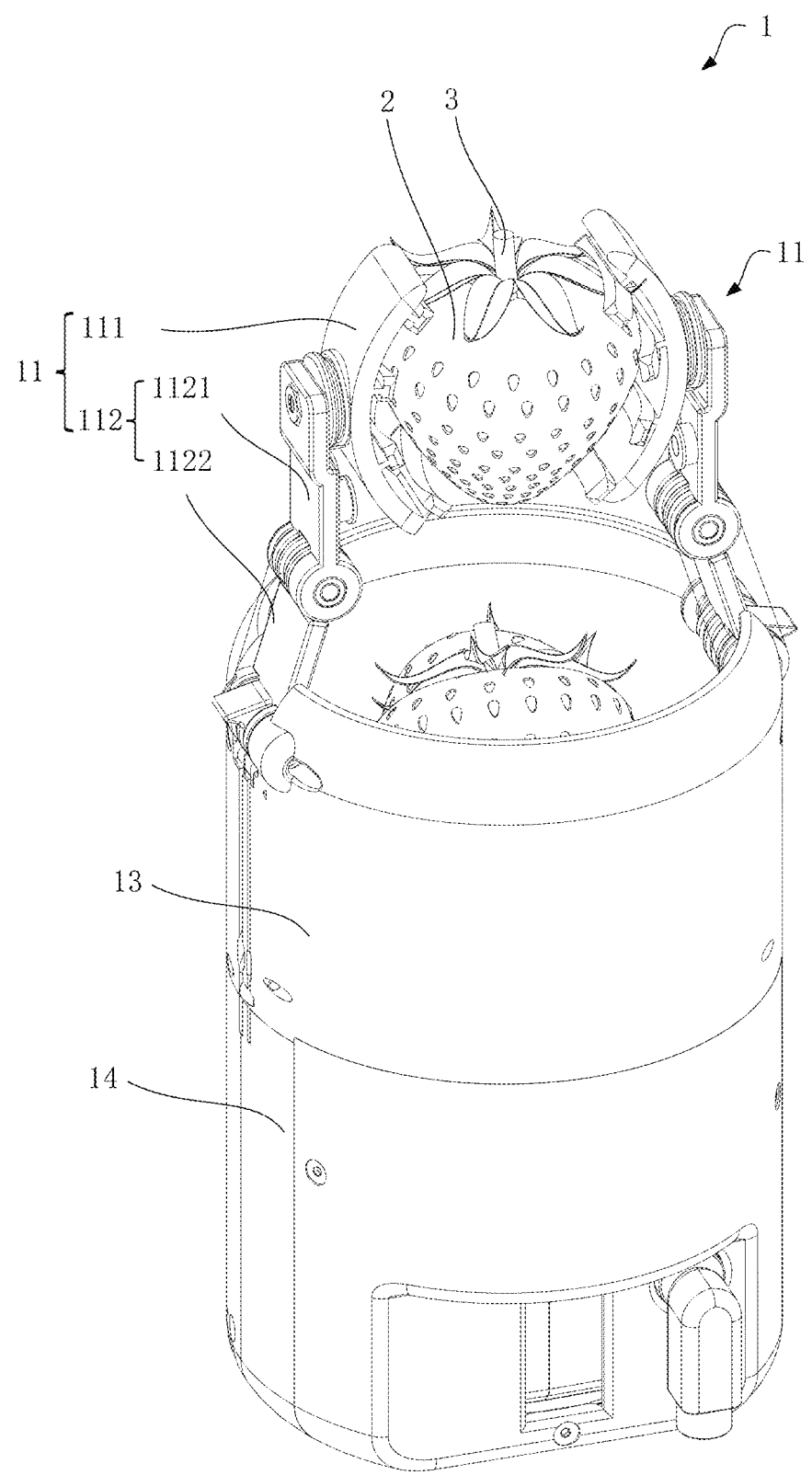
FIG. 12 is a schematic diagram of a snap-off harvesting gripper according to an embodiment of the present disclosure.

Specifically, in some embodiments, as shown in FIG. 9 and FIG. 12, a gripping space is formed in the snap-off harvesting gripper 1, which is used to grip the fruit 2 to be harvested. Step S102: controlling the snap-off harvesting gripper to grip the fruit to be harvested according to the position and orientation of the fruit to be harvested, includes the following steps:

Step S1021: acquiring a distance between each obstacle and the fruit to be harvested, and when the distance between the obstacle and the fruit to be harvested is less than or equal to a first preset distance, controlling the snap-off harvesting gripper to move the corresponding obstacle, and making the distance between each obstacle and the fruit to be harvested greater than the first preset distance;

Step S1022: adjusting the orientation of the snap-off harvesting gripper to make the gripping space in fit with the shape of the fruit to be harvested, and controlling the snap-off harvesting gripper to approach the fruit to be harvested until a center line of the gripping space coincides with a center line in a vertical direction of the fruit to be harvested;

Step S1023: controlling the snap-off harvesting gripper to grip the fruit to be harvested, and in the process of controlling the snap-off harvesting gripper to grip the fruit to be harvested, reciprocally rotating an end joint of the snap-off harvesting gripper to move the surrounding obstacles thereof; and Step S1204: adjusting the position and orientation of the snap-off harvesting gripper to make the distance between the snap-off harvesting gripper and each obstacle greater than a second preset distance.

Figure 10:
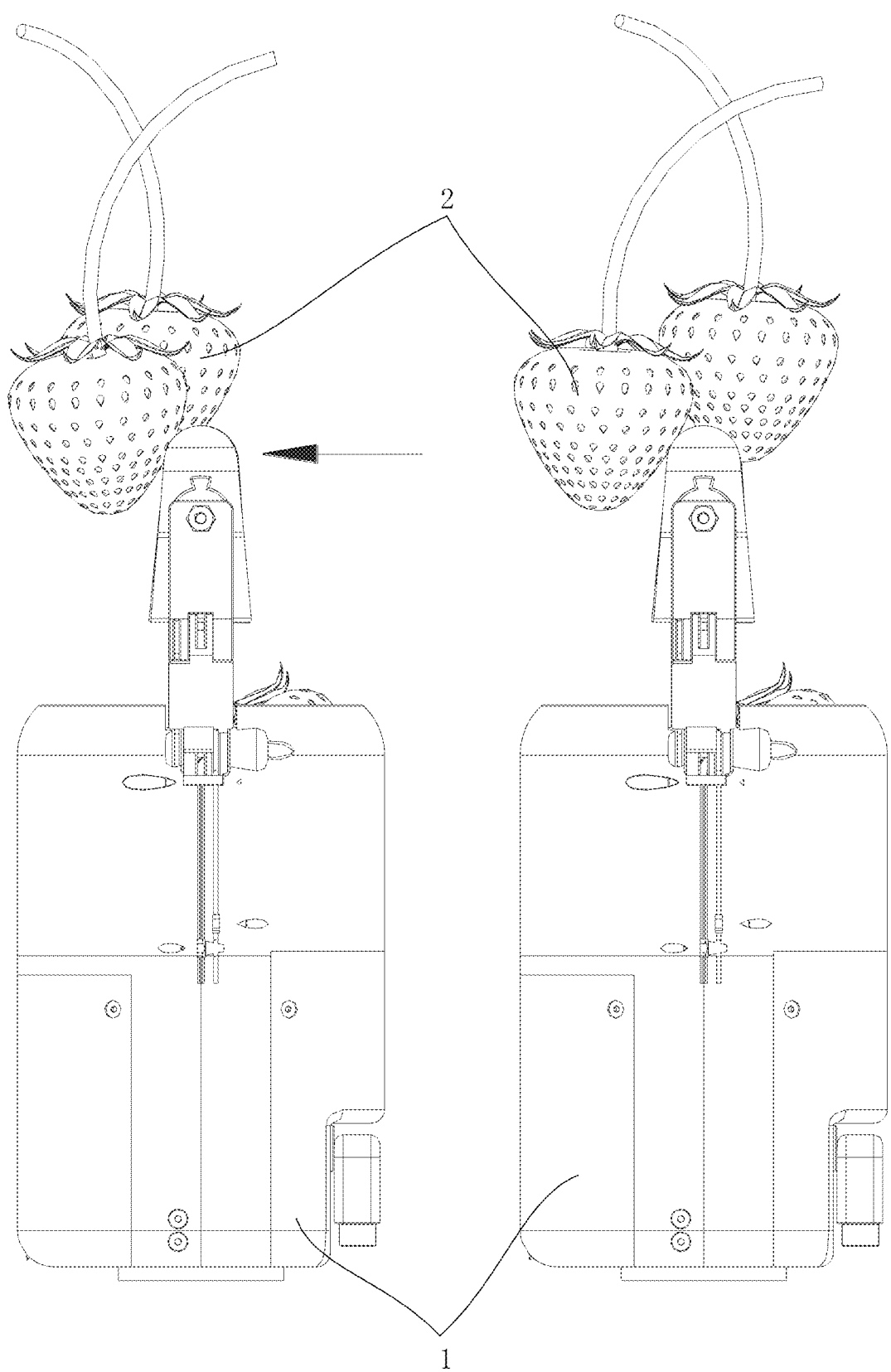
FIG. 10 is a schematic diagram of a snap-off harvesting gripper according to an embodiment of the present disclosure for moving an obstacle before gripping a fruit to be harvested.

After the fruit 2 to be harvested and the obstacles near the fruit 2 to be harvested are identified through the image, in order to avoid the collision damage between the obstacles and the fruit 2 to be harvested or the snap-off harvesting gripper 1 in the harvesting process, the obstacles that are too close to the fruit 2 to be harvested need to be moved far away in advance. Specifically, whether the obstacles are too close to the fruit 2 to be harvested needs to be determined according to the distance between the obstacles and the fruit 2 to be harvested, that is, when the distance between the obstacles and the fruit 2 to be harvested is less than or equal to the first preset distance, the corresponding obstacle needs to be moved away from the fruit 2 to be harvested (as shown in FIG. 10), making the distance between the obstacles and the fruit 2 to be harvested less than the first preset distance.

After identifying the shape of the fruit 2 to be harvested in the image, the orientation of the snap-off harvesting gripper 2 can be adjusted. Specifically, a width and a direction of the gripping space can be adjusted to make the width of the gripping space slightly greater than that of the fruit 2 to be harvested and to reduce the volume of the gripping space as much as possible, thus reducing the space occupied by the snap-off harvesting gripper 1 as much as possible, and reducing the possibility that the snap-off harvesting gripper 1 collides other obstacles in the moving process. Afterwards, the snap-off gripper 1 is controlled to approach the fruit 2 to be harvested, such that the fruit 2 to be harvested can be completely entered into the gripping space, and a central line of the gripping space coincides with that of the fruit 2 to be harvested in a vertical direction, enabling the snap-off harvesting gripper 1 to grip symmetrical positions of the fruit 2 to be harvested in the vertical direction, so as to later rotate the fruit 2 to be harvested.

Figure 11:
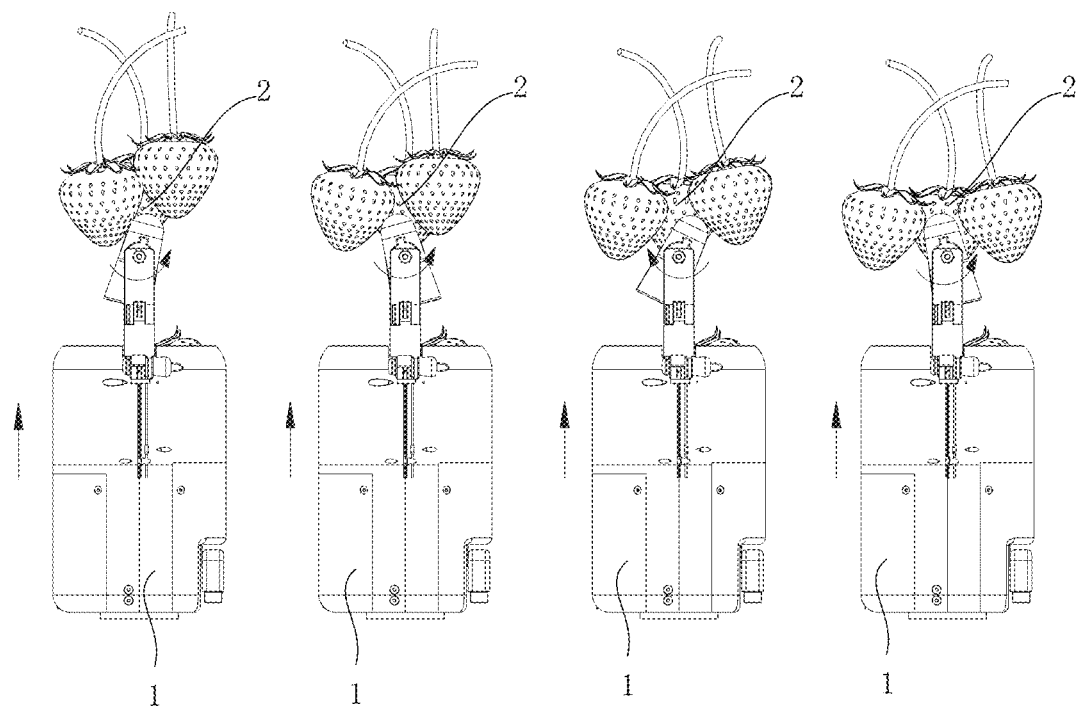
FIG. 11 is a schematic diagram of a snap-off harvesting gripper for moving an obstacle in the process of gripping fruits to be harvested.

In the process of controlling the snap-off harvesting gripper 1 to approach and grip the fruit 2 to be harvested, an end joint of the snap-off harvesting gripper 1 can be synchronously and reciprocally rotated to move the surrounding obstacles (as shown in FIG. 11), thus further moving the obstacles around the fruit 2 to be harvested far away to avoid the obstacles interfering the harvesting process. It may be understood that when there are less obstacles, the above step of reciprocally rotating the snap-off harvesting gripper 1 to move the surrounding obstacles can be omitted, thus improving the harvesting speed.

After the fruit 2 to be harvested is gripped by the snap-off harvesting gripper 1, because there may be obstacles, such as fruits, branches and leaves, near the fruit 2 to be harvested, when the snap-off harvesting gripper 1 rotates the fruit 2 to be harvested, the snap-off harvesting gripper 1 and the fruit 2 to be harvested may collide with these obstacles, causing damage to the snap-off harvesting gripper 1 and the fruit 2 to be harvested. Therefore, before the snap-off harvesting gripper 1 rotates the fruit 2 to be harvested, it is required to adjust the position and orientation of the snap-off harvesting gripper 1 according to the position of each obstacle, making the distance between the snap-off harvesting gripper 1 and each obstacle greater than the second preset distance. Therefore, the snap-off harvesting gripper 1 can avoid each obstacle when rotating the fruit 2 to be harvested, thus avoiding the snap-off harvesting gripper 1 colliding the fruit 2 to be harvested. Specifically, the second preset distance needs to be calculated and determined according to a rotating structure of the snap-off harvesting gripper 1 and the size of the fruit 2 to be harvested.

It is easy to understand that the first preset distance needs to be calculated and determined according to the second preset distance. Specifically, the first preset distance is the basis for determining whether the distance between the snap-off harvesting gripper and each obstacle can be greater than the second preset distance through the obstacle clearing means during and after the process of gripping the fruit 2 to be harvested. That is, before the fruit 2 to be harvested is gripped, the distance between the obstacle and the fruit 2 to be harvested is less than or equal to the first preset distance, indicating that it cannot make the distance between the obstacle and the fruit 2 to be harvested greater than the second preset distance through the obstacle clearing means during and after the process of gripping the fruit 2 to be harvested, and thus enough space cannot be cleared for harvesting. Accordingly, when the distance between all obstacles and the fruit 2 to be harvested is greater than the first preset distance, it is indicated that enough space can be cleared for harvesting through the subsequent obstacle clearing steps.

Figure 13:
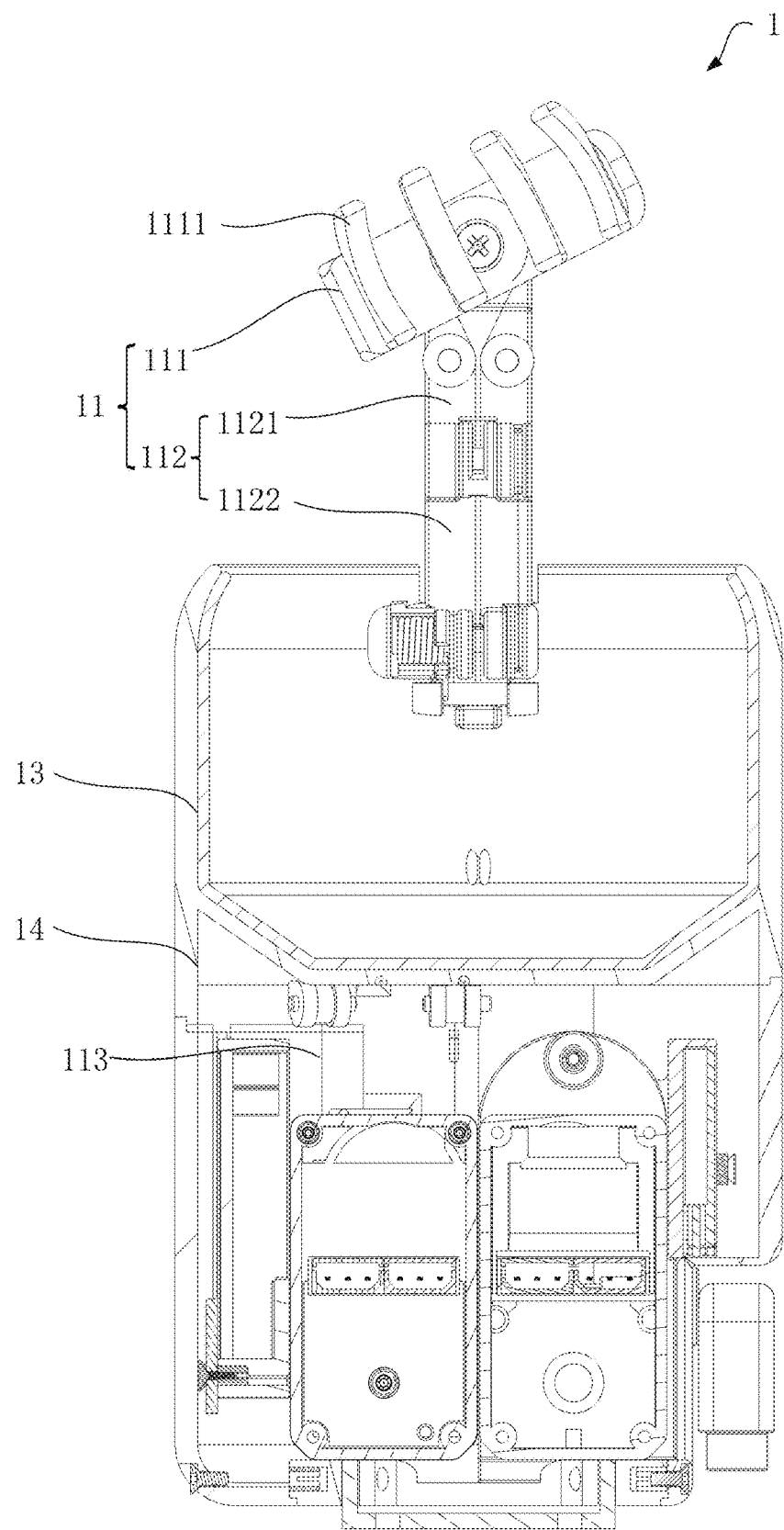
FIG. 13 is a first sectional view of a snap-off harvesting gripper according to an embodiment of the present disclosure.
Figure 14:
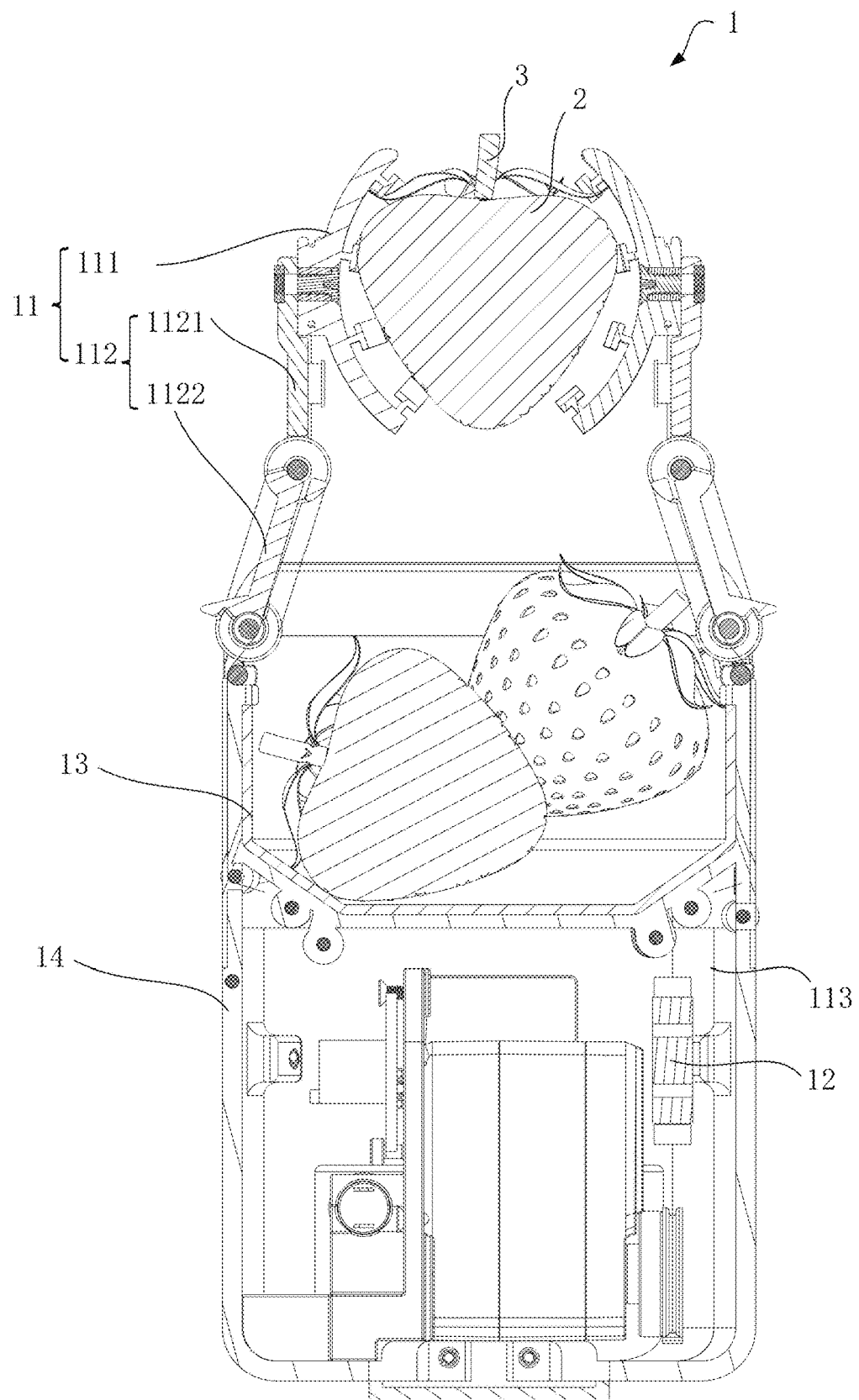
FIG. 14 is a second sectional view of a snap-off harvesting gripper according to an embodiment of the present disclosure.

In another aspect, as shown in FIG. 12 to FIG. 14, corresponding to a harvesting method of the snap-off harvesting gripper, a snap-off harvesting gripper 1 is further provided, including a multi-axis adjusting device (not show in figure), a gripping device 11, sensor assemblies 12, and a control device (not shown in figure). The gripping device 11 includes first joints 111 arranged oppositely, and joint assemblies 112 corresponding to the first joints 111 one by one. A gripping space for gripping a fruit 2 to be harvested is formed between the two first joints 111, and the first joints 111 are rotatably arranged on the corresponding joint assemblies 112. The joint assemblies 112 are movably arranged on the multi-axis adjusting device to adjust the distance between the first joints 111. The sensor assemblies 12 are arranged at the first joints 111 and the joint assemblies 112, so as to detect force on the first joints 111 and the joint assemblies 112. The control device is electrically connected with the multi-axis adjusting device, the gripping device 11 and the sensor assemblies 12. The control device is used to identify a position and an orientation of the fruit 2 to be harvested according to an image of the fruit 2 to be harvested, to control the multi-axis adjusting device to adjust a position of the gripping device 11 according to the position and orientation of the fruit 2 to be harvested, to control the first joints 111 to grip the fruit 2 to be harvested according to the force on the joint assemblies 112, and to control the first joints 111 to rotate to pick the fruit 2 to be harvested according to the force on the first joints 111.

In this embodiment, the control device is arranged, and can process and identify the image of the fruit 2 to be harvested, so as to determine the position and orientation of the fruit 2 to be harvested, and operate the multi-axis adjusting device according to the position and orientation of the fruit 2. By adjusting the position of the gripping device along multiple axes, the gripping device 11 is enabled to approach the fruit 2 to be harvested, and the first joints 111 are aligned with the fruit 2 to be harvested. Afterwards, the joint assemblies 112 are controlled to move in the multi-axis adjusting device to adjust the distance between the first joints 111, enabling the first joints 111 contact with and grip the fruit 2 to be harvested from both sides, and the gripping force of the first joints 111 to the fruit 2 to be harvested is controlled according to the force on the joint assemblies 112. Afterwards, the first joints 111 are controlled to rotate the fruit to be harvested 2 to bend the fruit stem 3 of the fruit 2 to be harvested until the fruit stem 3 is broken off, thus completing the harvesting of the fruit 2 to be harvested. In the rotating process, the control device is used to determine whether the fruit to be harvested 2 has been separated from the fruit stem 3 according to the force on the first joints 111, such that the control device can accurately control the first joints 111 to rotate until the fruit stem 3 is broken off, and immediately stops rotating after the fruit stem 3 is broken off, which can not only ensure the success rate, but also improve the harvesting efficiency.

The snap-off harvesting gripper 1 provided by the present disclosure can be used to achieve the harvesting method of the previous embodiment, and thus has the advantages of the harvesting method of the previous embodiment, which will not be described in detail here again.

Alternatively, a visual device (such as a laser radar, a camera, etc.) is arranged on the snap-off harvesting gripper 1 to shoot or scan images around the snap-off harvesting gripper 1.

Figure 15:
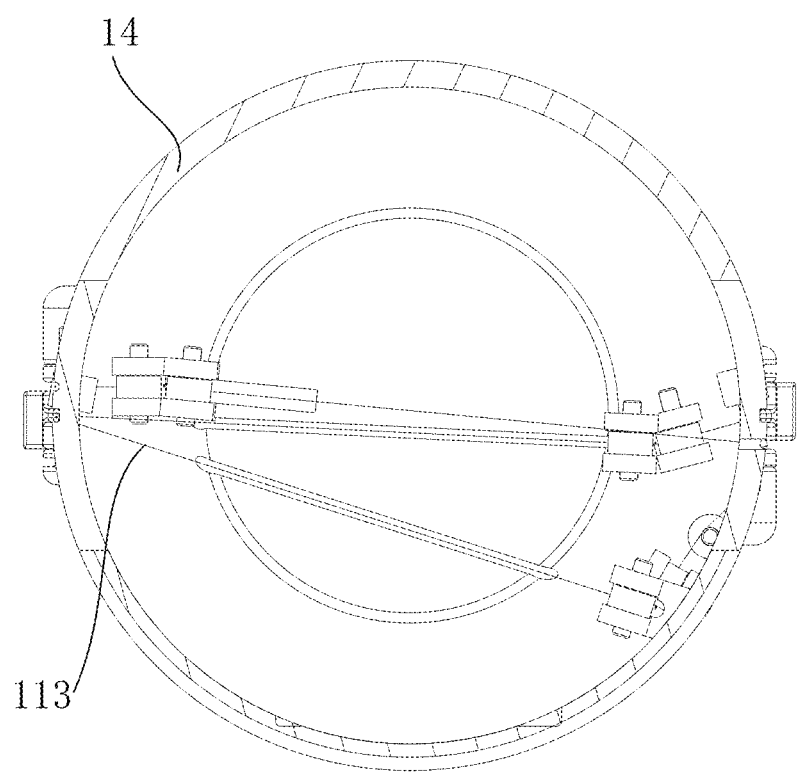
FIG. 15 is a schematic diagram of a transmission rope according to an embodiment of the present disclosure.

Specifically, in some embodiments, as shown in FIG. 13 to FIG. 15, the joint assemblies 112 include a second joint 1121 and a third joint 1122. The gripping device 11 further includes a first driving part, and a second driving part. A fixed portion is arranged on the multi-axis adjusting device. The first joints 111 can be rotatably arranged at the corresponding second joint 1121, an output end of the first driving part is in transmission connection with the first joints 111, thus driving the first joints 111 to rotate to snap off the fruit stem 3 of the fruit 2 to be harvested. The third joint 1122 is rotatably connected to the multi-axis adjusting device, and an output end of the second driving part is in transmission connection with the third joint 1122. The second joint 1121 is rotatably connected to the corresponding third joint 1122, and a rotating shaft of the second joint 1121 is connected to the fixed portion. The second driving part is used to drive the third joint 1122 to rotate to adjust a spacing between the first joints 111. When the third joint 1122 rotates, the fixed portion drives the rotating shaft of the second joint 1121 to rotate reversely to make the opposite second joint 1121 keep parallel. The first driving part and the second driving part are electrically connected to the control device.

In this embodiment, the control device controls the second driving part to drive the third joint 1122 to rotate, the two third joints 1122 can rotate towards directions away from each other, enabling the first joints far away from each other, or rotating the two third joints 1122 to approach each other, making the first joints 111 approach each other, and thus enabling the first joints 111 grip or loose the fruit 2 to be harvested. When the third joint 1122 rotates, the fixed portion can drive the rotating shaft of the second joint 1121 to rotate reversely relative to the third joint 1122, making the opposite second joint 1121 always keep parallel. When the spacing between the first joints 111 on the second joint 1121 changes, the sides of the first joints 111 for gripping the fruit 2 to be harvested can always be opposite to achieve the gripping function. When the fruit 2 to be harvested is gripped by the first joints 111, the control device can control the first driving part to drive the first joints 111 to rotate to drive the fruit 2 to rotate, such that the fruit stem 3 of the fruit 2 to be harvested is bent and finally broken off.

Specifically, the fixed portion includes a first pulley and a fixed rope. The first pulley is fixedly arranged at the multi-axis adjusting device, and a second pulley coaxial with the rotating shaft is arranged at the rotating shaft of the second joint 1121. The fixed rope is wound around the first pulley and the second pulley, and fixedly connected to the first pulley and the second pulley.

In this embodiment, the fixed rope is wound around the first pulley and the second pulley, and fixedly connected with the first pulley and the second pulley, when the third joint 1122 rotates, the fixed rope can rotate to drive the second joint 1121 to rotate reversely relative to the third joint 1122, such that an angle between the second joint 1121 and the fixed portion always remains unchanged, and the two opposite second joints 1121 always remain parallel.

Specifically, in some embodiments, as shown in FIG. 14 and FIG. 15, the first driving part and the second driving part each include a driving motor and a transmission rope 113. Output ends of the driving motors of the first driving part and the second driving part are in transmission connection with rotating shafts of the first joints 111 and the third joint 1122 through the corresponding transmission ropes 113, respectively.

In this embodiment, the output ends (usually output shafts) of the driving motors of the first driving part and the second driving part can rotate to drive the transmission ropes 113 to rotate, thus respectively driving the first joints 111 and the third joint 1122 to rotate around their own rotating shafts to achieve the adjustment of the spacing between the first joints 111, or rotate the first joints 111 to pick the fruit 2 to be harvested. The transmission rope 113 is used for transmission, and can be turned conveniently, which is more convenient for the arrangement of each driving motor and transmission structure, and can make the overall layout of the whole snap-off harvesting gripper 1 more compact, thus beneficial to reducing the volume of the whole snap-off harvesting gripper 1.

It is easy to understand that the transmission rope 113 may also be replaced with a transmission belt, the structure and technical effect thereof are similar to those in above embodiments, and thus will not be described in detail here again.

In a specific embodiment, as shown in FIG. 12 and FIG. 13, each of the first joints 111 is connected to the second joint 1121 through a revolute, the second joint 1121 is connected to the third joint 1122 through a revolute, and the third joint 1122 is connected to the multi-axis adjusting device through a revolute. The revolute of the first joints 111 is perpendicular to the revolute of the second joint 1121 and the revolute of the third joint 1122.

Grooves for winding the transmission rope 113 are circumferentially configured at the revolute of the first joints 111, and the transmission rope 113 is wound around the groove and the output end of the first driving part, and the output end of the first driving part rotates to drive the transmission rope 113 to rotate, thus driving the first joints 111. The revolute of the first joints 111 and the output end of the first driving part can be guided through a fixed pulley, such that the transmission rope 113 can avoid other structures in the snap-off harvesting gripper 1, and an internal structure of the snap-off harvesting gripper 11 is more compact to save the space.

Similarly, the structure of the revolute of the third joint 1122 is similar to the transmission connecting structure of the second driving part, and thus will not be described in detail here again.

Figure 16:
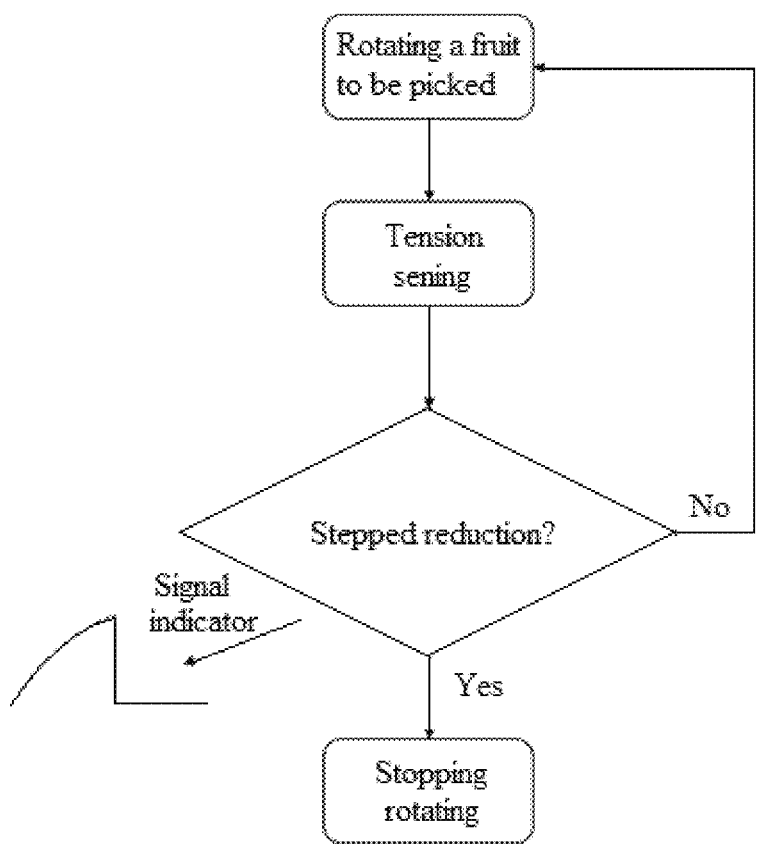
FIG. 16 is a flow schematic diagram of a control of tension for a first joint according to an embodiment of the present disclosure.
Figure 17:
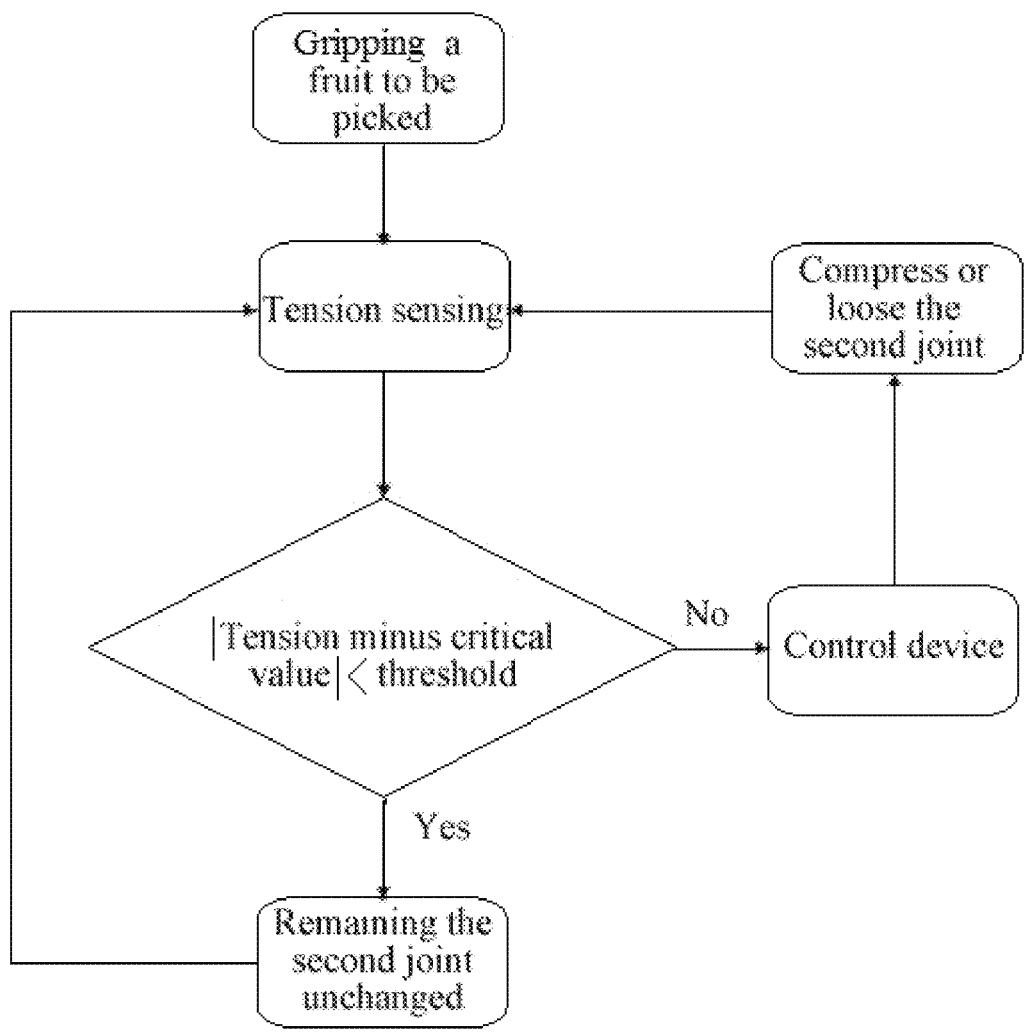
FIG. 17 is a flow schematic diagram of a control of tension for a third joint according to an embodiment of the present disclosure.

In some embodiments, as shown in FIG. 16 and FIG. 17, the sensor assemblies 12 include a first tension sensor, and a second tension sensor. The first tension sensor is arranged at the transmission rope 113 or transmission belt of the first driving part; and the second tension sensor is arranged at the transmission rope 113 or transmission belt of the second driving part.

In this embodiment, the first tension sensor is arranged on the transmission rope 113 or the transmission belt of the first driving part to detect the tension transferred by the transmission rope 113 or the transmission belt, and the rotation moment exerted on the first joint 111 can be calculated according to the tension transferred by the transmission rope 113 or the transmission belt, and a current connection status between the fruit 2 to be harvested gripped by the first joints 111 and the fruit stem 3 can be determined according to the rotation moment exerted on the first joints 111, such that the control device can control the first driving part according to the connection status, the first joints 111 can rotate the fruit 2 to be harvested to snap off the fruit stem 3, and stop rotating when the fruit stem 3 is broken off. Similarly, the second tension sensor is arranged on the transmission rope 113 or the transmission belt of the second driving part to detect the tension transferred by the transmission rope 113 or the transmission belt, the acting force of the third joint 1122 on the first joints 111 can be calculated according to the tension transferred by the transmission rope 113 or the transmission belt, such that the gripping force of the first joints 111 on the fruit 2 to be harvested can be calculated, the control device can control the second driving part according to the connection status to control the gripping force, and the first joints 111 can grip and fix the fruit 2 to be harvested without damaging the fruit 2 to be harvested.

Figure 18:
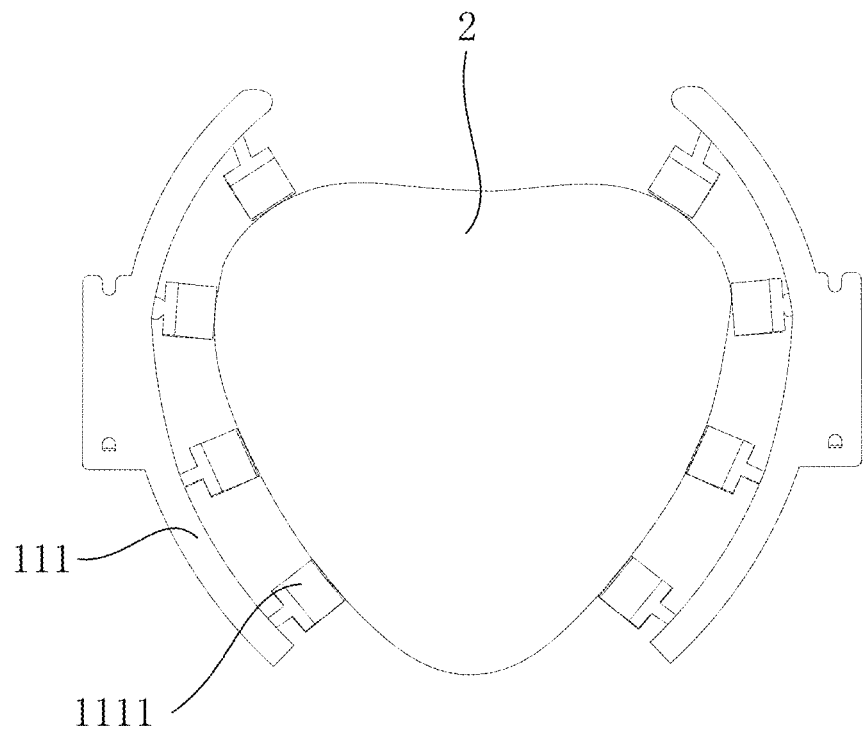
FIG. 18 is a schematic diagram of a first joint according to an embodiment of the present disclosure.
Figure 19:
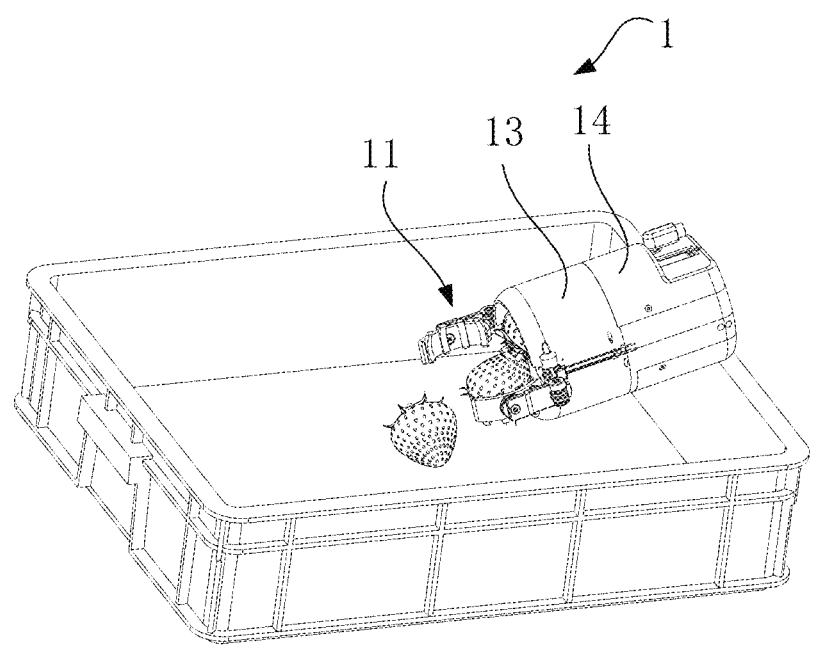
FIG. 19 is a schematic diagram of a snap-off harvesting gripper 1 according to an embodiment of the present disclosure for packing fruits into boxes.

In some embodiments, as shown in FIG. 18, multiple flexible protruded portions 1111 are arranged at one side of the first joints 111 facing the gripping space. When the first joints 111 grip the fruit 2 to be harvested, the multiple flexible protruded portions 1111 are abutted against the fruit 2 to be harvested and generate elastic deformation.

In this embodiment, multiple flexible protruded portions 1111 are arranged on one side of the first joints 111 facing the gripping space, when the first joints 111 grip the fruit 2 to be harvested, the flexible protruded portions 1111, when making contact with the fruit 2 to be harvested, can elastically deform to be closely attached to the surface of the fruit 2 to be harvested, such that the contact area between the fruit 2 to be harvested and the first joints 111 are larger, the contact force between the fruit 2 to be harvested and the first joints 111 is more uniform, and thus the first joints 111 can grip the fruit 2 to be harvested more stably. Meanwhile, the flexible protruded portions 1111 can elastically deform according to the surface morphology of the fruit 2 to be harvested when making contact with the fruit 2 to be harvested, such that the first joints 111 can be suitable for more fruits 2 to be harvested with different shapes and surfaces.

In a specific embodiment, as shown in FIG. 18, the first joints 111 are of an arc structure. The flexible protruded portion 111 includes a contact portion with a large size, and a connecting portion with a narrow and small size. The contact portion is connected to an inner side of the arc structure by the connecting portion. When the first joints 111 grip the fruit 2 to be harvested, the fruit 2 to be harvested squeezes the contact portion to bend the connecting portion, such that the contact portion is tangent to the surface of the fruit 2 to be harvested, which is better contract with the fruit 2 to be harvested, strengthening the gripping stability of the first joints 111.

In some embodiments, as shown in FIG. 12 to FIG. 14 and FIG. 19, the snap-off harvesting gripper 1 further includes a storage bin 13, and an electrical appliance bin 14. A storage chamber with an opening at its one side is constructed in the storage bin 13, the gripping device 11 is arranged at an opening position of the storage chamber, and the storage chamber 13 is arranged at the multi-axis adjusting device. After gripping the fruit 2 to be harvested and separating the fruit 2 to be harvested from the fruit stem 3, the gripping device 11 can loosen the fruit 2 to be harvested and make the fruit 2 to be harvested fall into the storage chamber for temporary storage. After the storage chamber is full, the multi-axis adjusting device is controlled to move the storage bin 13 to a centralized storage place (such as a box, a wooden bucket, etc.) and pour the harvested fruits into the centralized storage place. The electrical appliance bin 14 is arranged at the bottom of the storage bin 13, and an electrical appliance accommodating cavity is constructed in the electrical appliance bin 14 for accommodating electrical elements such as a driving motor.

The embodiments described above are only schematic, and some or all of the modules of which can be selected according to actual needs to achieve the purpose of the solutions in those embodiments. Those skilled in the art can understand and implement the solutions in those embodiments without creative labor.

Finally, it should be noted that the above embodiments are only used to illustrate rather than limiting the technical solution of the present disclosure. Although the present disclosure has been described in detail with reference to the foregoing embodiments, those skilled in the art should understand that it is still possible to modify the technical solution described in the foregoing embodiments, or to replace some technical features described in the foregoing embodiments with equivalents. However, these modifications or substitutions do not make the essence of the corresponding technical solutions deviate from the spirit and scope of the technical solutions of various embodiments of the present disclosure.

What is claimed is:

1. A harvesting method of a snap-off harvesting gripper, comprising the following steps:
    identifying a position and orientation of a fruit to be harvested according to an image of the fruit to be harvested;
    controlling the snap-off harvesting gripper to grip the fruit to be harvested according to the position and orientation of the fruit to be harvested;
    monitoring an acting force of the snap-off harvesting gripper acted on the fruit to be harvested, determining a connection status between a fruit stem and the fruit to be harvested according to the acting force, and controlling the snap-off harvesting gripper to rotate the fruit to be harvested according to the connection status between the fruit stem and the fruit to be harvested, thus bending the fruit stem until the fruit stem is separated from the fruit to be harvested;
    wherein the snap-off harvesting gripper comprises:
    a multi-axis adjusting device;
    a gripping device, comprising first joints arranged oppositely and joint assemblies corresponding to the first joints one by one, wherein a gripping space configured for gripping a fruit to be harvested is formed between two first joints, the first joints are rotatably arranged on a corresponding one of the joint assemblies, and the joint assemblies are movably arranged on the multi-axis adjusting device to adjust a distance between the first joints;
    sensor assemblies arranged at the first joints and the joint assemblies and configured to detect a force exerted on the first joints and the joint assemblies; and
    a control device electrically connected to the multi-axis adjusting device, the gripping device, and the sensor assemblies, wherein the control device is configured to identify a position and orientation of the fruit to be harvested according to an image of the fruit to be harvested, control the multi-axis adjusting device to adjust a position of the gripping device according to the position and orientation of the fruit to be harvested, control the first joints to grip the fruit to be harvested according to the force exerted on the joint assemblies, and control the first joints to rotate to pick the fruit to be harvested according to the force exerted on the first joints;
    wherein the joint assemblies each comprise a second joint and a third joint, the gripping device further comprises a first driving part and a second driving part, and a fixed portion is arranged on the multi-axis adjusting device;
    each of the first joints is rotatably arranged at a corresponding second joint, an output end of the first driving part is in transmission connection with the first joints to drive the first joints to rotate to snap off a fruit stem of the fruit to be harvested;
    the third joint is rotatably connected to the multi-axis adjusting device, an output end of the second driving part is in transmission connection with the third joint, the second joint is rotatably connected to a corresponding third joint, and a rotating shaft of the second joint is connected to the fixed portion;
    the second driving part is configured to drive the third joint to rotate to adjust a spacing between the first joints, when the third joint rotates, the fixed portion drives the rotating shaft of the second joint to rotate reversely, thus keeping opposite second joints parallel;
    the first driving part and the second driving part are both electrically connected to the control device.

2. The harvesting method of a snap-off harvesting gripper according to claim 1, wherein the step of monitoring an acting force of the snap-off harvesting gripper acted on the fruit to be harvested, determining a connection status between a fruit stem and the fruit to be harvested according to the acting force, and controlling the snap-off harvesting gripper to rotate the fruit to be harvested according to the connection status between the fruit stem and the fruit to be harvested, thus bending the fruit stem until the fruit stem is separated from the fruit to be harvested comprises the following steps:
    monitoring a rotation moment of the snap-off harvesting gripper relative to the fruit to be harvested;
    continuing to increase a rotation angle of the snap-off harvesting gripper to the fruit to be harvested when the rotation moment of the fruit to be harvested relative to the snap-off harvesting gripper is not plunged in a stepped manner; and
    controlling the snap-off harvesting gripper to stop rotating when the rotation moment of the fruit to be harvested relative to the snap-off harvesting gripper is plunged in a stepped manner.

3. The harvesting method of a snap-off harvesting gripper according to claim 1, wherein the step of controlling the snap-off harvesting gripper to grip the fruit to be harvested comprises the following steps:
    monitoring a gripping force of the snap-off harvesting gripper acted on the fruit to be harvested; and
    controlling the snap-off harvesting gripper to keep the gripping force within a preset range.

4. The harvesting method of a snap-off harvesting gripper according to claim 1, wherein the step of identifying a position and orientation of the fruit to be harvested according to an image of the fruit to be harvested comprises the following steps:

identifying a shape and position of the fruit to be harvested and an obstacle near the fruit to be harvested according to the image of the fruit to be harvested.

5. The harvesting method of a snap-off harvesting gripper according to claim 4, wherein a gripping space configured for gripping the fruit to be harvested is formed in the snap-off harvesting gripper; the step of controlling the snap-off harvesting gripper to grip the fruit to be harvested according to the position and orientation of the fruit to be harvested comprises the following steps:

acquiring a distance between each obstacle and the fruit to be harvested, and when the distance between the obstacle and the fruit to be harvested is less than or equal to a first preset distance, controlling the snap-off harvesting gripper to move the corresponding obstacle, and making the distance between each obstacle and the fruit to be harvested greater than the first preset distance;

adjusting the orientation of the snap-off harvesting gripper to make the gripping space in fit with the shape of the fruit to be harvested, and controlling the snap-off harvesting gripper to approach the fruit to be harvested until a center line of the gripping space coincides with a center line in a vertical direction of the fruit to be harvested;

controlling the snap-off harvesting gripper to grip the fruit to be harvested, and in the process of controlling the snap-off harvesting gripper to grip the fruit to be harvested, reciprocally rotating an end joint of the snap-off harvesting gripper to move surrounding obstacles of the end joint of the snap-off harvesting gripper; and adjusting the orientation of the snap-off harvesting gripper to make the distance between the snap-off harvesting gripper and each obstacle greater than a second preset distance.

6. The harvesting method of a snap-off harvesting gripper according to claim 1, wherein the fixed portion comprises a first pulley and a fixed rope; the first pulley is fixedly arranged on the multi-axis adjusting device;

a second pulley is coaxially arranged at the rotating shaft of the second joint, and the fixed rope is wound around the first pulley and the second pulley and fixedly connected to the first pulley and the second pulley.

7. The harvesting method of a snap-off harvesting gripper according to claim 1, wherein the first driving part and the second driving part each comprise a driving motor and a transmission rope/belt;

output ends of the driving motors of the first driving part and the second driving part are in transmission connection with rotating shafts of the first joints and the third joints through corresponding transmission ropes/belts, respectively.

8. The harvesting method of a snap-off harvesting gripper according to claim 7, wherein the sensor assemblies comprise a first tension sensor and a second tension sensor;

the first tension sensor is arranged at the transmission rope/belt of the first driving part; and the second tension sensor is arranged at the transmission rope/belt of the second driving part.

* * * * *